US012213950B2

(12) United States Patent
Afzali et al.

(10) Patent No.: US 12,213,950 B2
(45) Date of Patent: Feb. 4, 2025

(54) MODULAR DISPENSER FOR MULTIPLE OBJECTS

(71) Applicant: CVS Pharmacy, Inc., Woonsocket, RI (US)

(72) Inventors: Adam A. Afzali, Duxbury, MA (US); Kyle Benton, Randolph, MA (US); Jessica H. Donohue, Bolton, MA (US); Donovan Duchak, Franklin, MA (US); Regan M. Fiascone, Boston, MA (US); Jamila S. Gramsey, Boston, MA (US); Darryl P. James, Beverly, MA (US); Andreas Senai, Framingham, MA (US); Timothy S. Tocci, Roxbury, MA (US); Elizabeth K. Winter, Carlisle, MA (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

(21) Appl. No.: 17/401,038

(22) Filed: Aug. 12, 2021

(65) Prior Publication Data

US 2022/0047460 A1 Feb. 17, 2022

Related U.S. Application Data

(60) Provisional application No. 63/064,679, filed on Aug. 12, 2020.

(51) Int. Cl.
*A61J 7/00* (2006.01)
*A61J 1/03* (2023.01)
*B65D 83/04* (2006.01)

(52) U.S. Cl.
CPC ............... *A61J 7/0076* (2013.01); *A61J 1/03* (2013.01); *B65D 83/04* (2013.01); *B65D 83/0409* (2013.01); *B65D 2583/044* (2013.01)

(58) Field of Classification Search
CPC ........... A61J 1/03; A61J 7/0076; B65D 83/04; B65D 83/0409; B65D 2583/044; B65D 2583/0481; G07F 11/18
See application file for complete search history.

(56) References Cited

U.S. PATENT DOCUMENTS 382,541 A * 5/1888 Martin .................... A47J 43/22 209/357
1,173,069 A * 2/1916 Walker .................... A24F 27/16 221/256

(Continued)

FOREIGN PATENT DOCUMENTS

CA 2291558 9/2009
CN 202529158 U 11/2012

(Continued)

OTHER PUBLICATIONS

International Search Report and Written Opinion for International Application No. PCT/US2021/045820, mailed Nov. 11, 2021, 13 pgs.

(Continued)

*Primary Examiner* — Gene O Crawford
*Assistant Examiner* — Kelvin L Randall, Jr.
(74) *Attorney, Agent, or Firm* — Patent Law Works, LLP

(57) ABSTRACT

A modular dispenser includes a cartridge configured to hold a plurality of pills. A dispensing base is configured to removably receive the cartridge. The dispensing base includes a funnel with a funnel inlet proximate the opening of the cartridge and a funnel outlet spaced apart from the funnel inlet. A drawer is configured to receive the at least one pill from the funnel outlet in a well and is configured to be slidably received within the dispensing base. A metering flap may be movably positioned between the funnel outlet and the well of the drawer. The metering flap is pivotably coupled to at least one of the funnel and the dispensing base (Continued)

and may be configured to one of a) at least partially block and b) fully block the funnel outlet when the drawer is slidably extended away from the dispensing base.

20 Claims, 21 Drawing Sheets

(56) References Cited

U.S. PATENT DOCUMENTS 1,471,621 A * 10/1923 McCord .................. A47K 5/10 222/243
1,685,183 A * 9/1928 Wilhelm ............. A63F 11/0002 221/256
2,180,916 A * 11/1939 Steuernagel ....... B65D 83/0409 221/312 R
2,342,748 A * 2/1944 Mayer ..................... A24F 15/10 221/256
2,378,868 A * 6/1945 Richmond ............. G07F 11/18 312/273
2,669,349 A * 2/1954 Silver ................ B65D 83/0409 221/202
3,313,451 A * 4/1967 Rhindress ............... A47J 39/02 221/256
3,788,517 A * 1/1974 Eannarino .......... B65D 83/0409 221/154
4,287,921 A * 9/1981 Sanford .................. A47J 47/01 141/286
4,531,658 A * 7/1985 Galopin .................. G01F 11/18 222/361
5,148,944 A * 9/1992 Kaufman ................ G07F 11/10 221/268
5,174,471 A * 12/1992 Kozlowski ......... B65D 83/0409 221/202
5,211,308 A * 5/1993 Decker .............. A47K 10/3818 221/303
5,219,093 A 6/1993 Moulding, Jr. et al.
5,421,491 A * 6/1995 Tuvim .................. A47J 31/404 222/336
5,730,333 A * 3/1998 Baluk ....................... A47F 1/03 222/561
5,979,717 A * 11/1999 Dalton ...................... A47F 1/03 222/536
6,598,787 B1 * 7/2003 Grinsteiner ............... G07F 9/06 232/15
6,622,887 B1 * 9/2003 Roediger ................ G07F 11/44 221/13
6,997,341 B2 2/2006 Pearson et al.
7,461,763 B1 * 12/2008 Winn ..................... B65G 65/46 222/413
7,555,362 B2 6/2009 Broussard et al.
7,870,974 B2 * 1/2011 Miller ..................... F25C 5/182 222/444
8,020,724 B2 9/2011 Remis et al.
8,521,326 B1 8/2013 Holtje
8,657,155 B2 * 2/2014 Dwork ............... B65D 83/0481 221/229
9,117,325 B1 * 8/2015 Sloan ...................... G07F 17/00
9,150,346 B1 * 10/2015 Aramian ................... A61J 7/04
9,241,873 B2 1/2016 Upchurch et al.
9,387,153 B1 7/2016 Mazur
9,501,887 B2 11/2016 Berg et al.
9,636,279 B2 5/2017 Song et al.
9,849,069 B1 12/2017 Khatri
9,870,450 B2 1/2018 Blackburn
9,908,686 B2 3/2018 Wang et al.
10,360,751 B2 7/2019 Berg et al.
2004/0039481 A1 2/2004 de la Huerga
2004/0065579 A1 * 4/2004 Wood .................... F25D 11/003 206/545
2005/0077314 A1 * 4/2005 Boykin ................... A47F 1/123 221/307
2008/0027579 A1 * 1/2008 van der Hoop ..... G07F 17/0092 700/242
2009/0145931 A1 * 6/2009 Peng ....................... G01F 11/24 222/367
2012/0234248 A1 * 9/2012 Lytle .................... A01K 5/0233 119/54
2013/0213998 A1 * 8/2013 Mills ..................... G01F 13/005 222/413
2014/0319164 A1 * 10/2014 Wilson ................. A47K 10/422 221/45
2015/0266654 A1 9/2015 Baarman et al.
2017/0079887 A1 3/2017 Song
2017/0304153 A1 10/2017 Williamson et al.
2017/0333283 A1 * 11/2017 Park .......................... F16K 1/18
2018/0303718 A1 10/2018 Song et al.
2018/0319570 A1 11/2018 Baarman et al.
2019/0337708 A1 * 11/2019 Li .......................... B65D 85/60
2019/0389277 A1 * 12/2019 Wade ..................... B60H 1/249
2020/0022875 A1 1/2020 Park
2020/0289375 A1 9/2020 Sujith

FOREIGN PATENT DOCUMENTS

CN 102917680 A 2/2013
CN 107438395 A 12/2017
CN 108602610 A 9/2018
CN 109998914 7/2019
CN 111467238 7/2020
CN 211168197 U 8/2020
KR 10-2017-0091521 8/2017

OTHER PUBLICATIONS

International Search Report and Written Opinion for International Application No. PCT/US2021/045773, mailed Dec. 6, 2021, 46 pgs.
Chinese Foreign Office Action dated Nov. 23, 2023, 11 pgs.
Translation of Chinese Office Action dated Nov. 23, 2023, 14 pgs.
Communication pursuant to Rules 161(1) and 162 EPC issued from the European Patent Office for EP Application No. 21766071.1 on Mar. 21, 2023, 3 pgs.
International Preliminary Report on Patentability for International Application No. PCT/US2021/045773, mailed Feb. 23, 2023, 7 pgs.
Communication pursuant to Rules 161(1) and 162 EPC issued from the European Patent Office for EP Application No. 2177739.8 on Mar. 21, 2023, 3 pgs.

* cited by examiner

MODULAR DISPENSER FOR MULTIPLE OBJECTS

BACKGROUND

Many people take pills, such as medications, vitamins, and supplements on a regular basis, sometimes even daily or several times each day. Presently, pills typically are dispensed in a child-proof or tamper resistant bottle that may be difficult to manipulate, may be difficult to store, and may be unsightly to keep in public view.

Consequently, there is a need for a modular dispenser that easily and conveniently stores and quickly dispenses to a user one or more pills of a variety of shapes and sizes. The modular dispenser should be suitable for storage on a counter or in an easily remembered and visible location.

BRIEF SUMMARY

A modular dispenser provides a user with the ability to organize and quickly and easily dispense one or more pills.

In one aspect, a modular dispenser comprises a cartridge configured to hold a plurality of pills. The cartridge comprises an opening through which at least one pill is configured to pass under an influence of gravity and a perimeter that extends around the opening. A dispensing base is configured to removably receive the cartridge. The dispensing base comprises a funnel with a funnel inlet proximate the opening of the cartridge and a funnel outlet spaced apart from the funnel inlet. A drawer is configured to receive the at least one pill. The drawer also is configured to be slidably received within the dispensing base. The drawer comprises a well to receive the at least one pill from the funnel outlet.

Examples may comprise one of the following features or any combinations thereof.

For example, the modular dispenser may comprise a metering flap movably positioned between the funnel outlet and the well of the drawer. The metering flap may be pivotably coupled to at least one of the funnel and the dispensing base. The metering flap optionally is configured to one of a) at least partially block and b) fully block the funnel outlet when the drawer is slidably extended away from the dispensing base. The metering flap may comprise a pin proximate a rear of the metering flap about which the metering flap is configured to move. Optionally, a rear lip of the well may be configured to engage a lower surface of the metering flap when the drawer is slidably extended away from the dispensing base, thereby causing the metering flap to pivot and to at least partially block the funnel outlet. The metering flap may be configured to be at least partially received within the well when the drawer is slidably moved into the dispensing base.

The funnel of the dispensing base may comprise a funnel platform that extends laterally away from the funnel. The dispensing base optionally comprises at least one pair of ribs configured to receive the funnel platform.

The funnel optionally comprises a funnel parapet extending away from the funnel towards the opening of the cartridge wherein at least one of the funnel parapet and the perimeter of the opening of the cartridge comprises an engagement mechanism configured to engage the other of the funnel parapet and the perimeter of the opening of the cartridge. The engagement mechanism may comprise a snap-fitting configured to engage a ridge on the perimeter of the opening of the cartridge.

The dispensing base optionally comprises a drawer ceiling configured to at least partially cover the well of the drawer when the drawer is fully received within the dispensing base. The dispensing base optionally comprises at least one guiding rail configured to engage with and to guide the drawer. The dispensing base may comprise at least one travel stop configured to prevent the drawer from being removed from the dispensing base.

The dispensing base may comprise at least one roller upon which the drawer is configured to roll.

The cartridge and the dispensing base may comprise a pair of complementary alignment features.

The modular dispenser may comprise at least one ballast.

In another aspect, a modular dispensing base configured to dispense at least one pill under an influence of gravity comprises a funnel with a funnel inlet and a funnel outlet spaced apart from the funnel inlet. A drawer may be configured to receive the at least one pill in a well from the funnel outlet. The drawer may be configured to be slidably received within the dispensing base. A metering flap may be pivotably coupled to at least one of the funnel and the dispensing base.

Examples of the modular dispensing base may comprise one of the following features, or one of the previously mentioned features of the modular dispenser discussed above, or any combination thereof.

For example, a rear lip of the well is configured to engage a lower surface of the metering flap when the drawer is slidably extended away from the dispensing base, thereby causing the metering flap to pivot and to at least partially block the funnel outlet.

In another aspect, a method of assembling a modular dispenser for pills comprises partially inserting a drawer into a drawer opening of a front cap of a dispensing base; positioning a funnel adjacent to one of a left panel and a right panel of the dispensing base; coupling the left panel to the right panel of the dispensing base; and coupling the front cap to the left panel and the right panel.

Examples of assembling the modular dispenser may comprise one of the following features, or one of the previously mentioned features of the modular dispenser discussed above, or any combination thereof.

For example, the method may further comprise pivotally coupling a metering flap to one of the dispensing base and the funnel.

All examples and features mentioned above can be combined in any technically possible way

BRIEF DESCRIPTION OF THE DRAWINGS

To further clarify the above and other advantages and features of the examples, reference to examples are illustrated in the appended drawings. The drawings depict only typical examples and are therefore not to be considered limiting. One or more examples will be described and explained with additional specificity and detail through the use of the accompanying drawings in which.

Common element numbers represent common features, even if the appearance of a feature varies slightly between the figures.

The drawings are not necessarily to scale.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

For purposes of this application, the term pill or pills is used to generically and collectively refer to one or more pills, capsules, soft gels, caplets, tablets, chewables, medication, vitamins, minerals, supplements, homeopathic substances and remedies, and the like.

Figure 1:
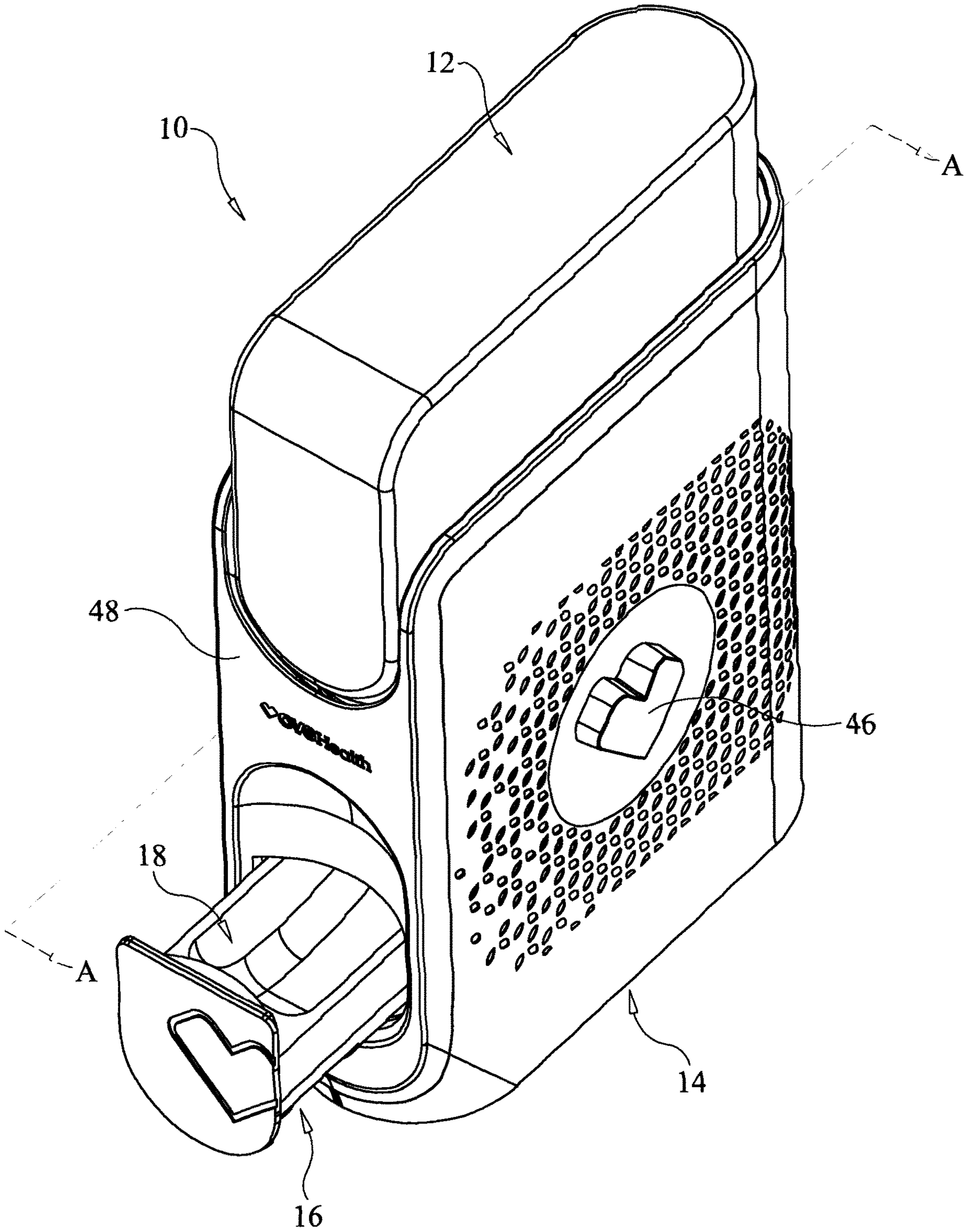
FIG. 1 is an example of a modular dispenser with an example of a cartridge, dispensing base, and drawer.
Figure 2:
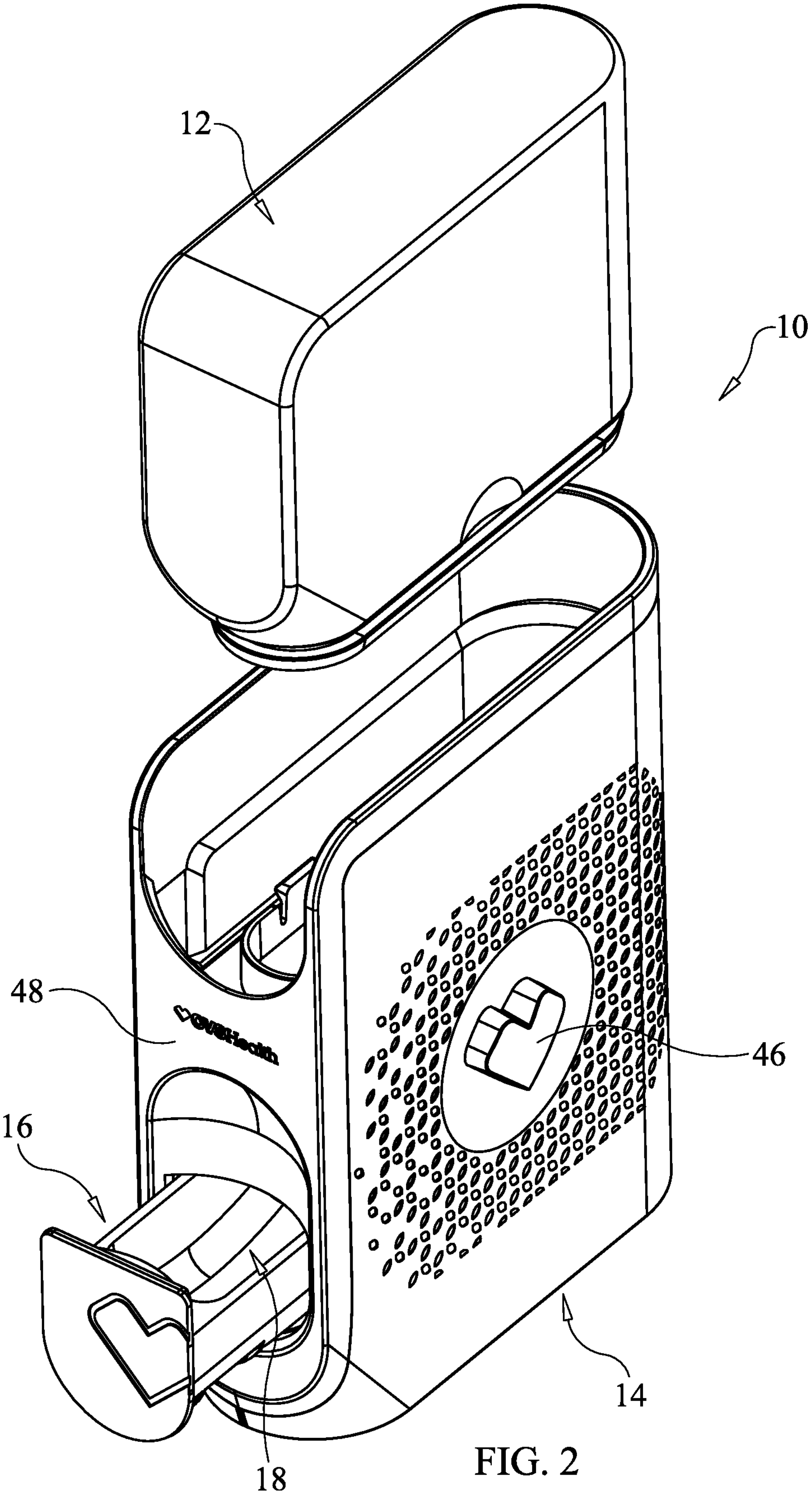
FIG. 2 is an example of the modular dispenser of FIG. 1 with the cartridge removed.
Figure 3B:
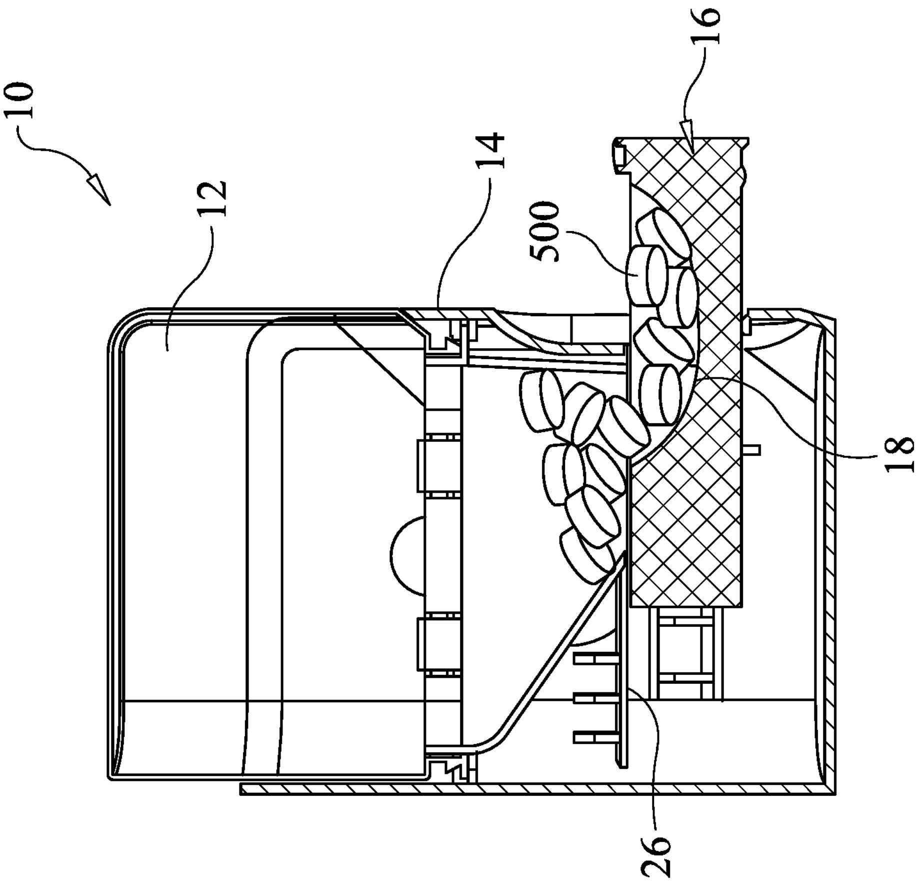
FIGS. 3A and 3B are a cross-section view of the modular dispenser of FIG. 1.
Figure 3A:
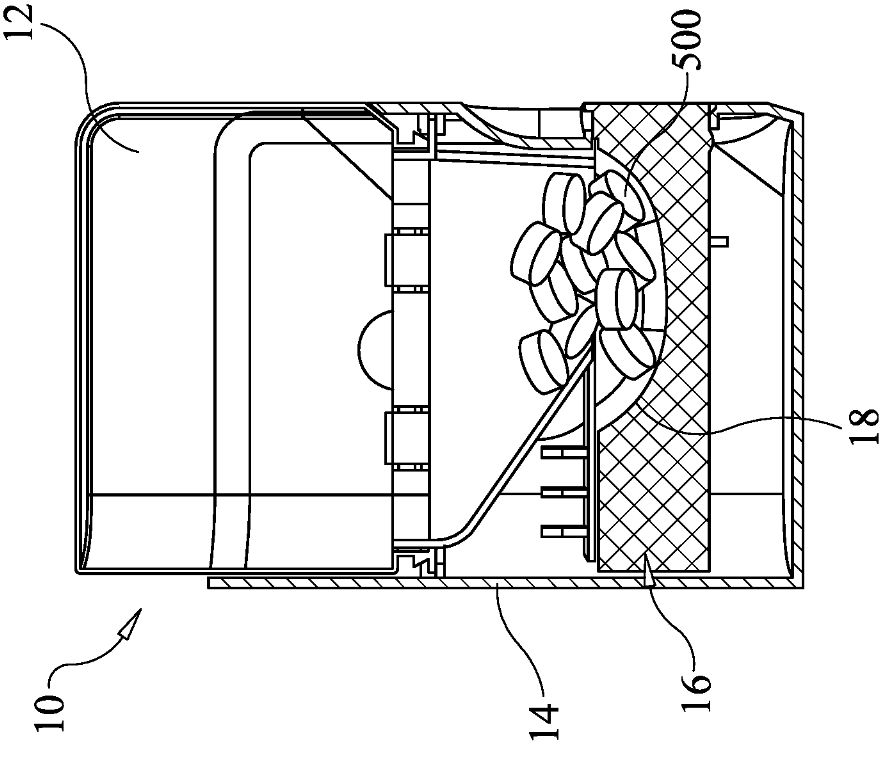
Figure 4A:
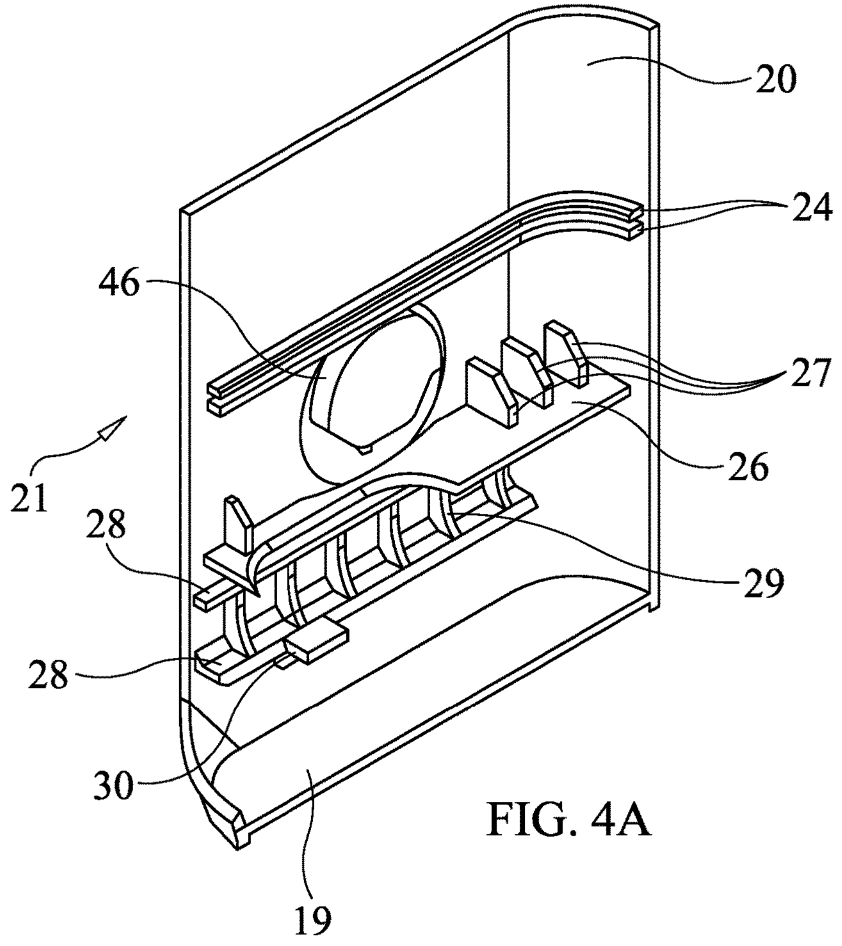
FIGS. 4As and 4B are perspective view of an example of a left side or left panel and a right side or right panel of the modular dispenser.
Figure 4B:
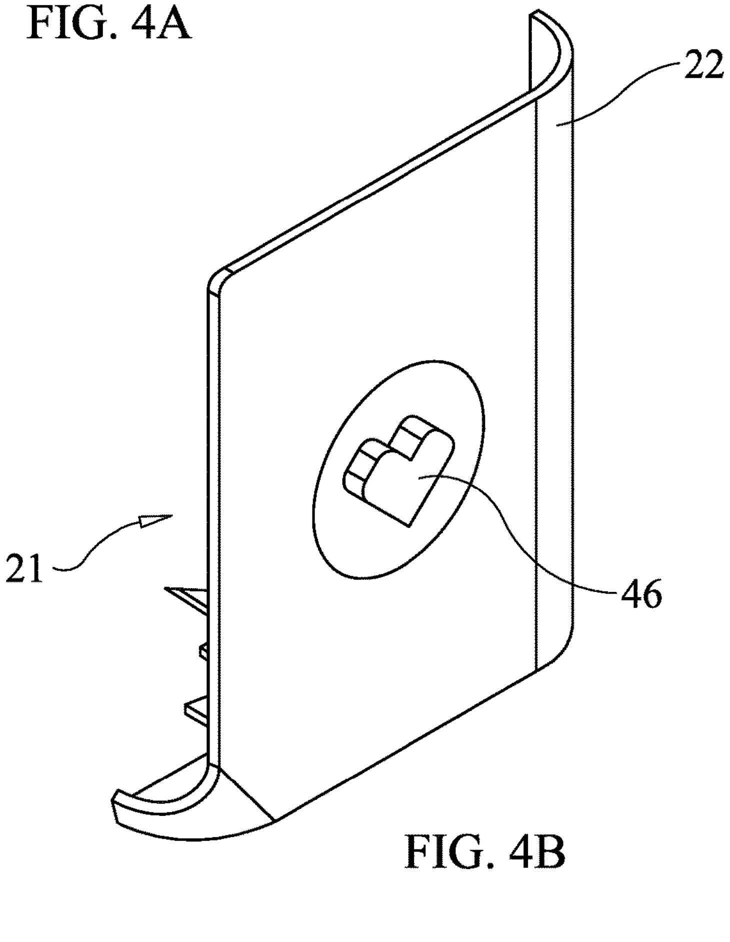
Figure 5A:
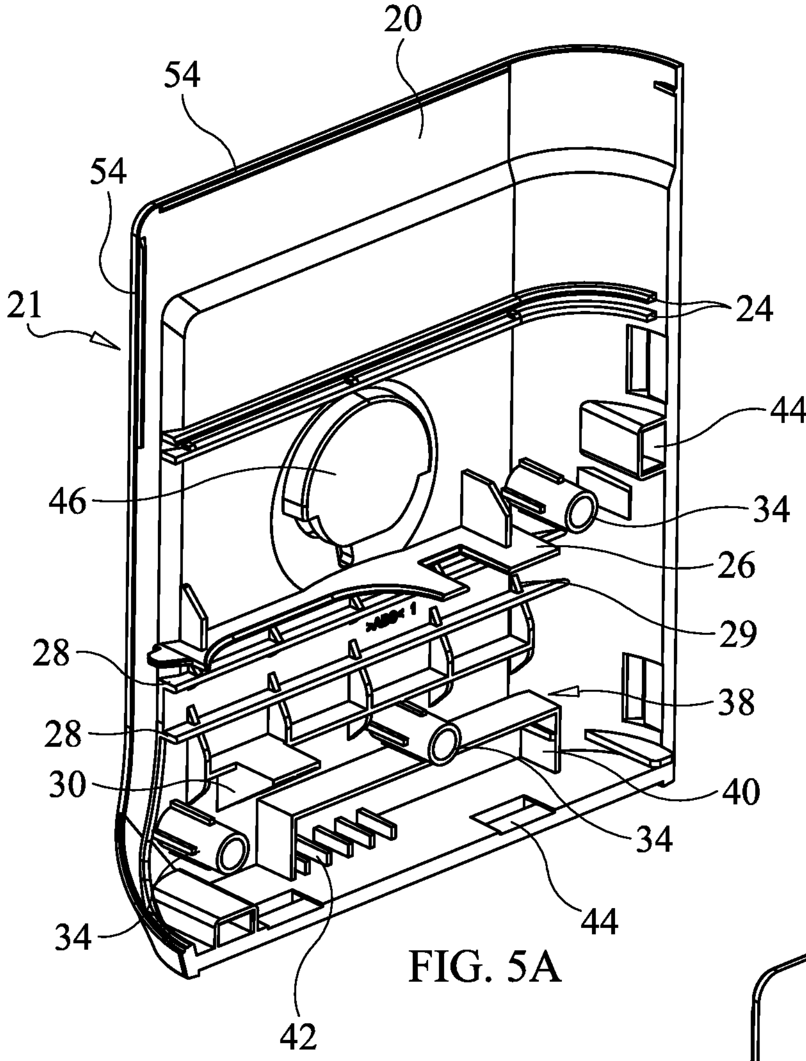
FIGS. 5A and 5B are perspective view of another example of a left side or left panel and a right side or right panel of the modular dispenser.
Figure 5B:
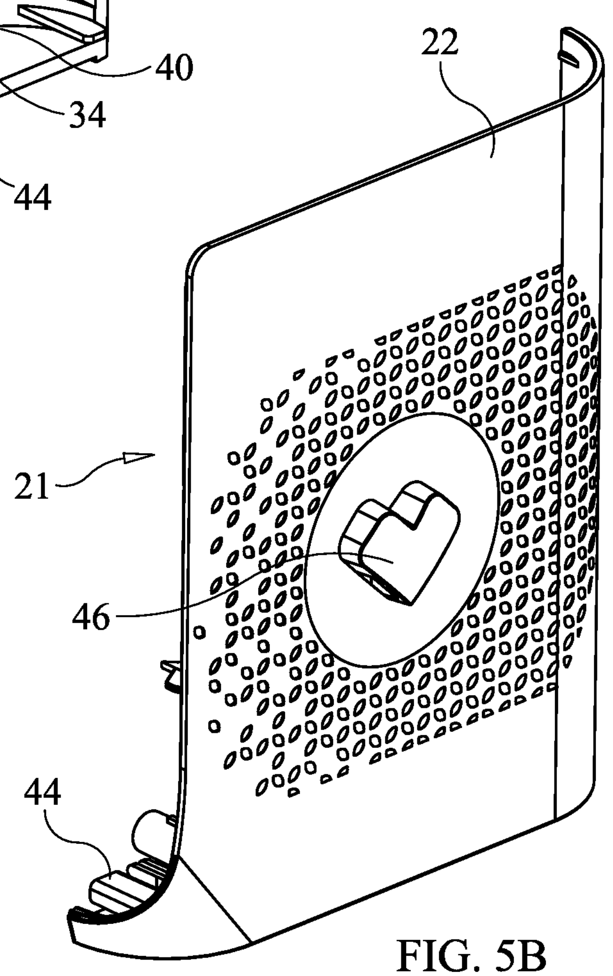
Figure 6:
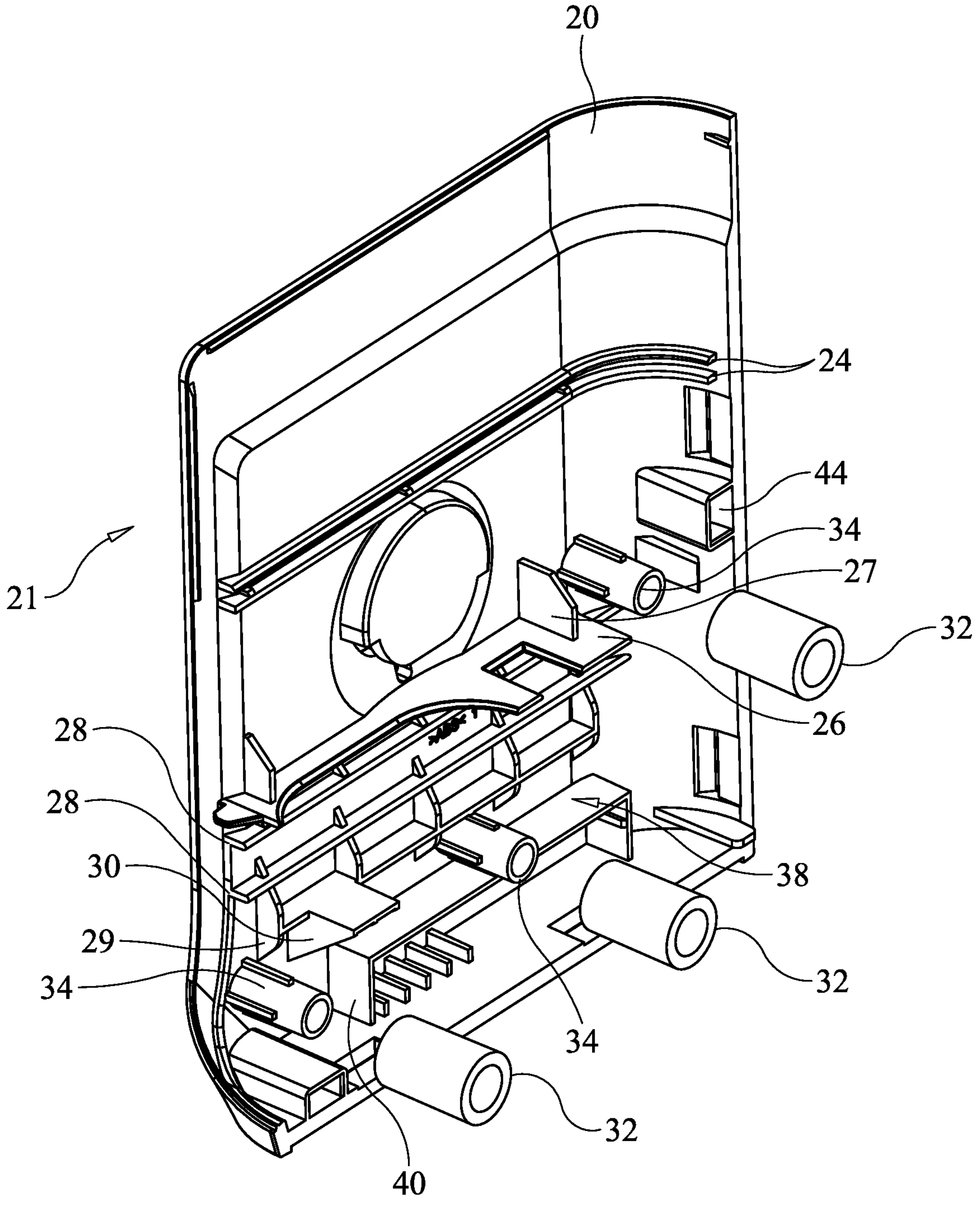
FIG. 6 is a perspective view of an interior of the left side of FIG. 5A.
Figure 7A:
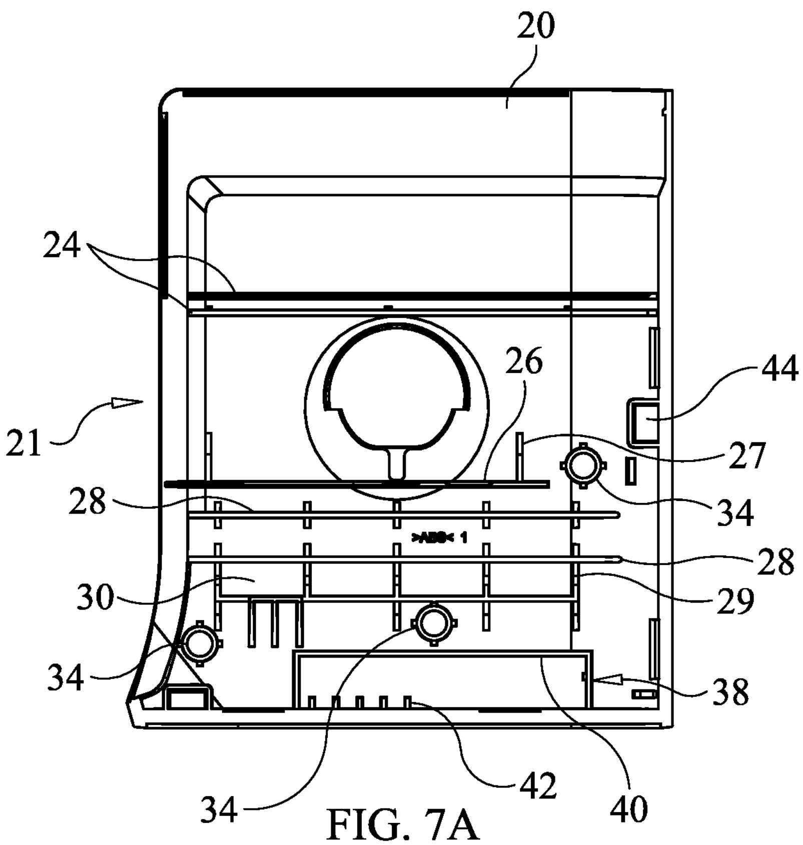
FIGS. 7A, 7B, and 7C are left, right, and front plan views of the left side of FIG. 5A.
Figure 7C:
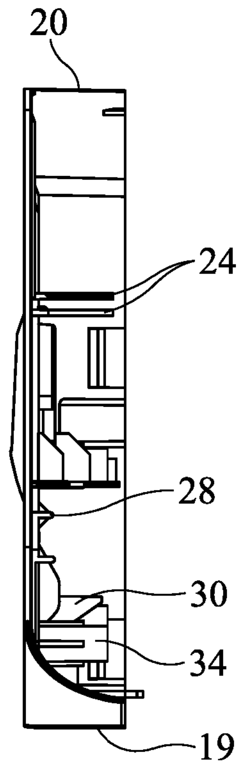
Figure 7B:
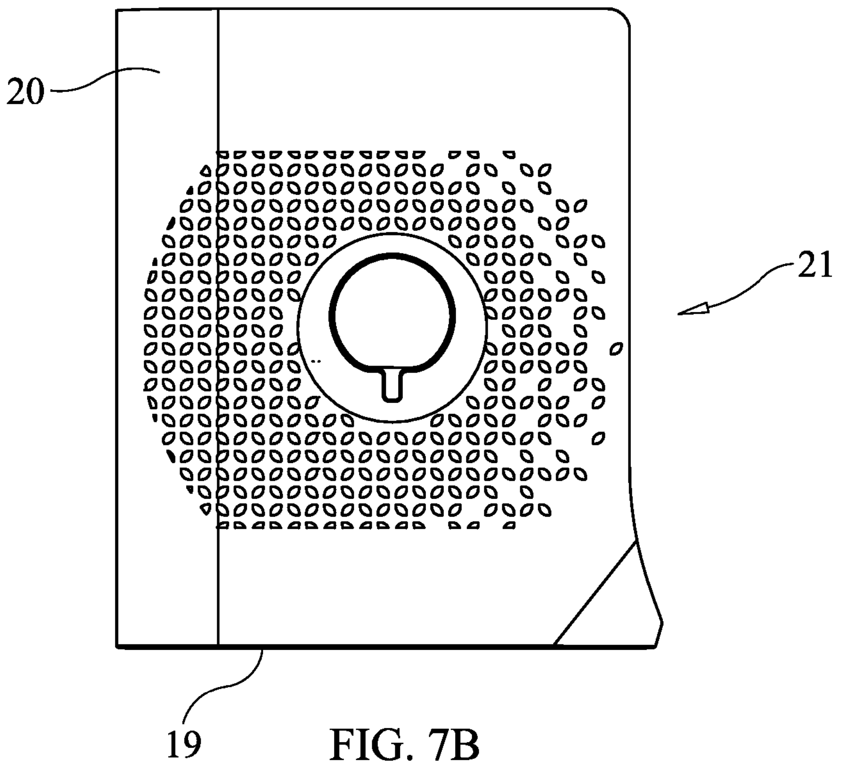
Figure 8A:
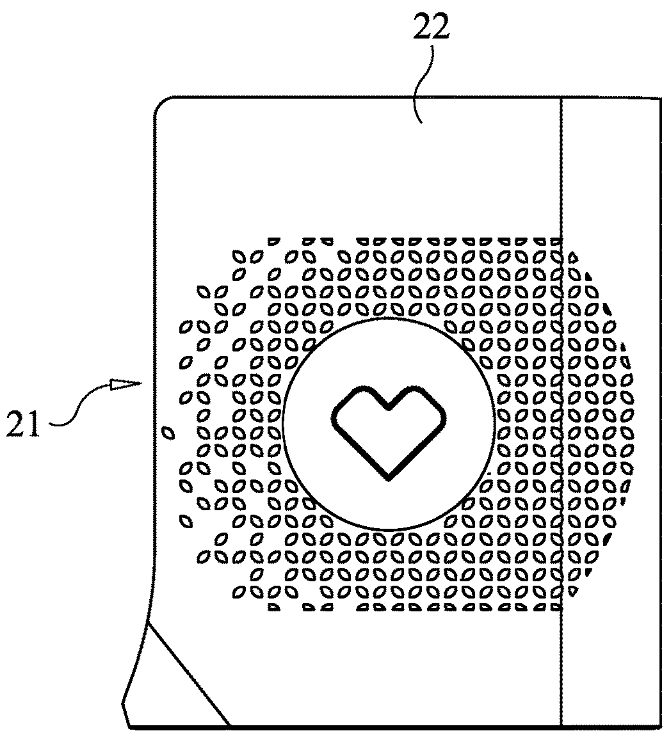
FIGS. 8A, 8B, and 8C are left, right, and front plan views of the left side of FIG. 5B.
Figure 8C:
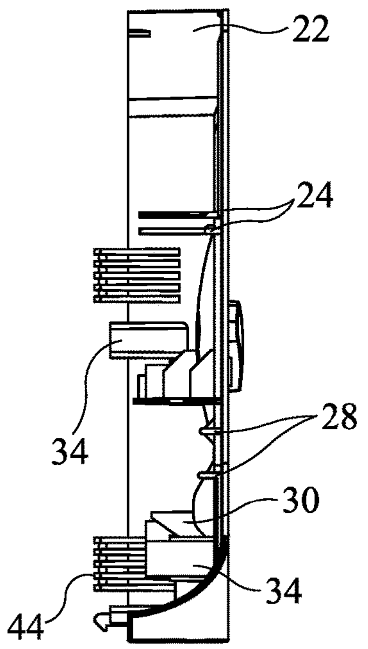
Figure 8B:
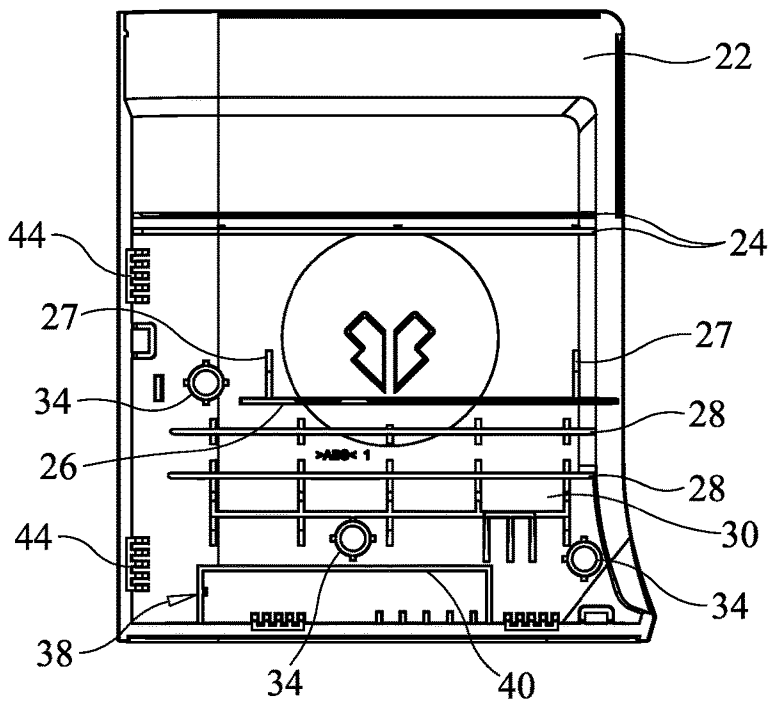
Figure 9A:
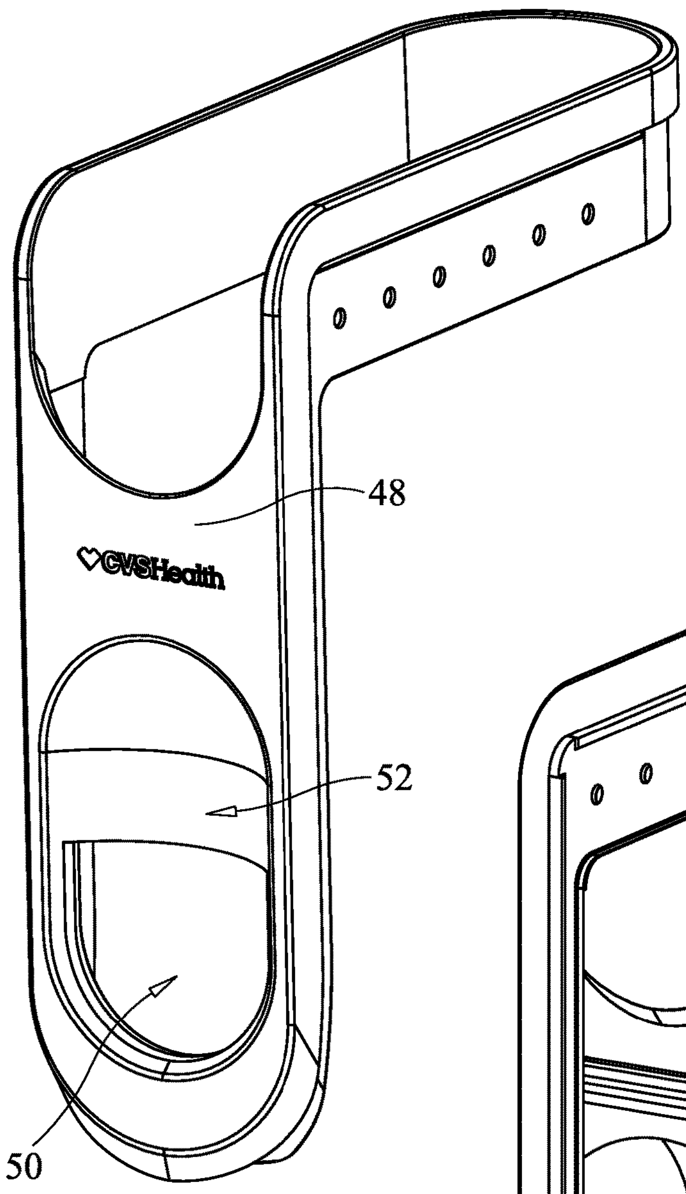
FIGS. 9A and 9B are perspective front and rear views of an example of a front side or a front cap.
Figure 9B:
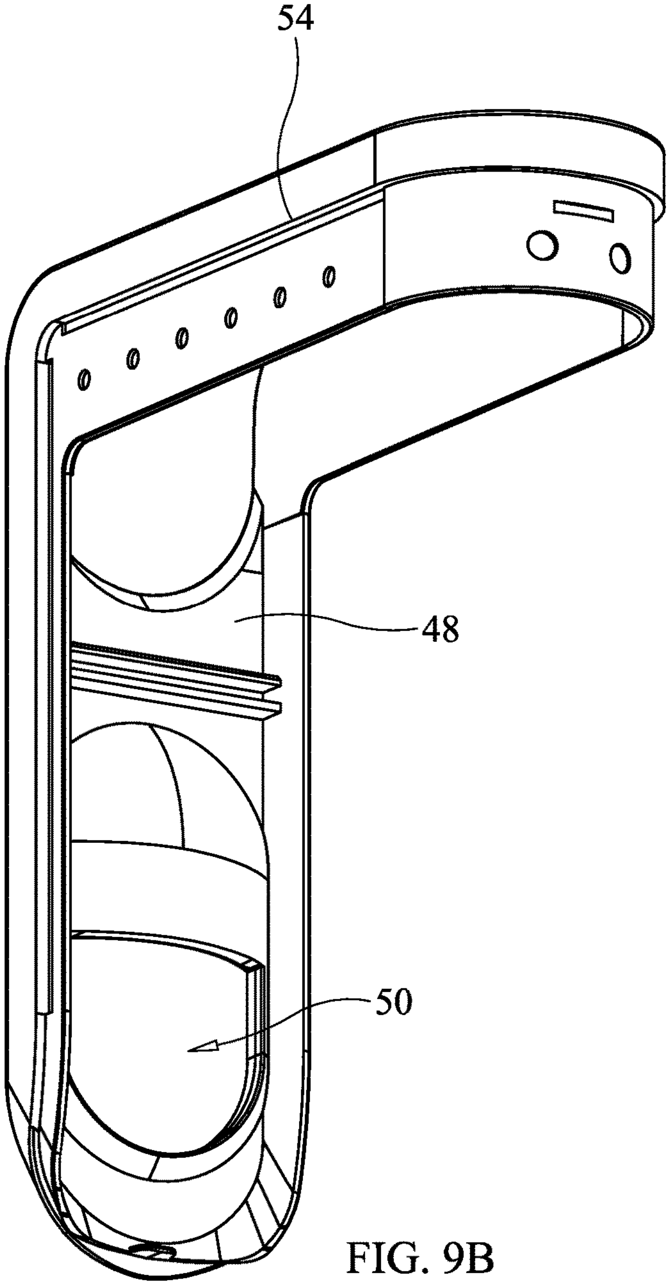

FIGS. 1 and 2 illustrate an example of a modular dispenser 10 with a removable and, optionally, refillable cartridge 12 configured to hold a plurality of pills. A dispensing base 14 is configured to removably receive the cartridge 12. The dispensing base includes a drawer 16 slidably received within the dispensing base 14. The drawer 16 is configured to receive at least one pill 500 in a well 18 of the drawer 16 as illustrated in the example in FIGS. 3A and 3B.

FIGS. 4A-8C illustrate examples of a left panel or left side 20 and a right panel or right side 22 of the dispensing base 14. The left side 20 and the right side 22 typically are mirror images of each other except for various complementary engagement features as will become apparent in the following discussion. In addition, the example of the left side 20 and the right side 22 illustrated in FIGS. 4A and 4B includes many common elements with the left side 20 and the right side 22 illustrated in FIG. 5A-8C, with any differences identified in the text and/or apparent from the drawings. Any of the features illustrated in FIGS. 4A and 4B may be used in addition to or alternatively to any of the features illustrated in FIGS. 5A-8C and vice-versa. Consequently, while most features will be illustrated and discussed within the context of the left side 20, the same feature optionally may exist on the right side 22 of the dispensing base 14.

The left side 20 and right side 22 may be formed of any material, such as metal, wood, and plastic. Typically, a molded or cast plastic is used to form the left side 20 and right side 22.

The left side 20 may include at least one pair of ribs 24 upon an interior portion of each side 20, 22. The ribs 24 are configured to receive a platform 102 of the funnel 78 as discussed below. The ribs 24 optionally may project inward or away from the left side 20 in a direction towards the right side 22.

The left side 20 of the dispensing base 14 optionally includes a drawer ceiling 26 configured to at least partially cover the well 18 of the drawer 16 when the drawer 16 is fully received within the dispensing base 14. The drawer ceiling 26 is sized and shaped to at least partially cover the well 18 to reduce the risk that a pill or pills 500 might escape from the well 18 or overflow the well 18 and fall into the interior of the dispensing base 14 from which it might be difficult to retrieve the pill 500. The drawer ceiling 26 may include one or more supports or mounts 27 that help stiffen and/or couple the drawer ceiling 26 to the left side 20. The drawer ceiling 26 optionally may project inward or away from the left side 20 towards the right side 22. In some examples, the drawer ceiling 26 of the left side 20 extends towards a complementary drawer ceiling (not illustrated) of right side 22, such that both drawer ceilings 26 at least partially cover and, in some instances, fully cover the well 18 when the drawer 16 is received within the dispensing base 14. The drawer ceiling 26 may be positioned below the ribs 24.

The left side 20 of the dispensing base 14 optionally includes at least one guiding rail 28 configured to engage with and to guide the drawer 16 into and out of the dispensing base 14. The guiding rail 18 optionally may project inward or away from the left side 20 towards the right side 22 and support the drawer 16 atop the guiding rail 28. The guiding rail 28 may assist in limiting the travel of the drawer 16 without any yaw, which is a rotation about a vertical axis (not illustrated) of the drawer 16 (plus or minus 10 degrees). The guiding rail 28 may be positioned below the drawer ceiling 26. The guiding rail 28 may include a plurality of guiding rails 28, wherein each guiding rail 28 is spaced vertically apart from an adjacent guiding rail 28. The guiding rail 28 may include one or more supports or mounts 29 that help stiffen and/or couple the guiding rail 28 to the left side 20. The supports or mounts 29 may extend above or below a guiding rail 28 or the support or mount 29 may span the distance between adjacent guiding rails 28.

The left side 20 may include at least one travel stop 30 configured to engage with and prevent the drawer 16 from being removed from the dispensing base 14. The travel stop 30 should be positioned on the left side sufficiently towards a front portion 21 of the left side 20 so that when the drawer 16 is withdrawn from the dispensing base 14 a user is able to use her fingers and/or thumb to retrieve a pill 500 from the well 18. The travel stop 30 can be any shape. For example, in FIG. 4A the travel stop 30 is planar while in FIGS. 5A and 6 the travel stop is triangular in shape.

The left side 20 may include at least one roller 32 positioned about a pin 34 as illustrated in FIGS. 5A, 6, 7A, 7C, 8A, 8C, 15A and 15B. The roller 32 may be a hollow cylinder configured to rotate about the pin 34. The pin 34 may extend entirely through the interior of the roller 32 or it may extend partially into the roller 32. The drawer 16 is configured to be at least partially supported by and to roll into and out of the dispensing base 14 on the roller 32. The roller 32 and the pin 34 may be formed of any material, such as plastic, metal, and the like.

Figure 22:
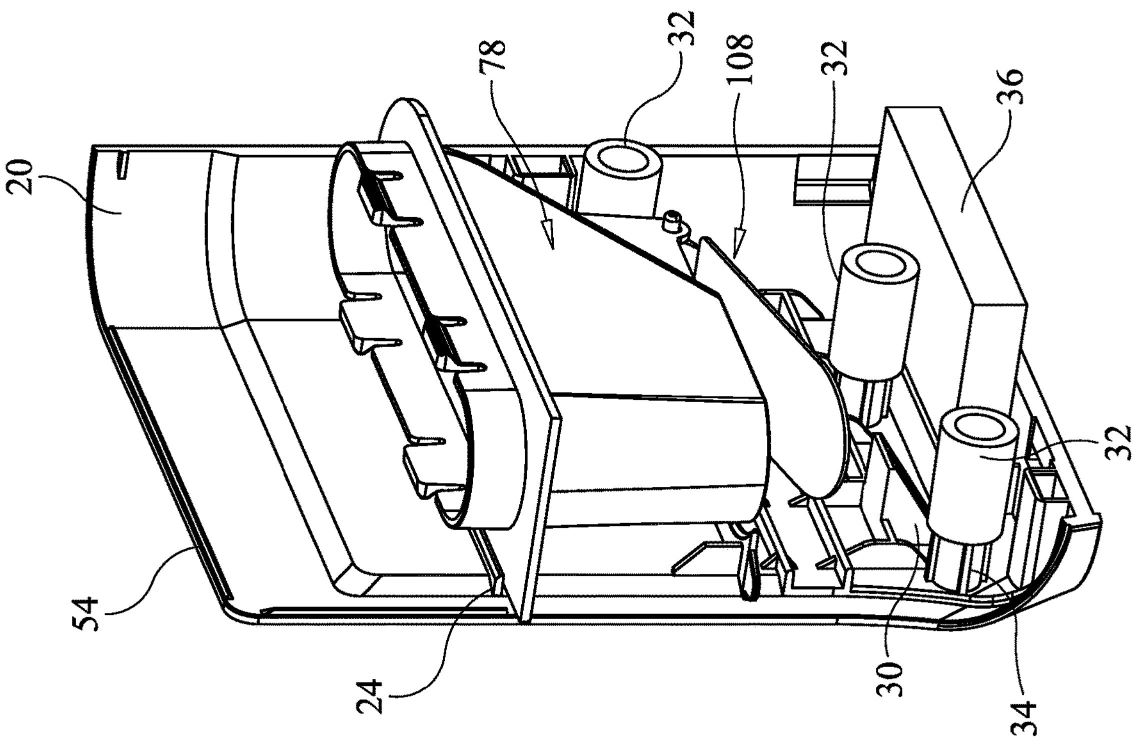
Figure 21:
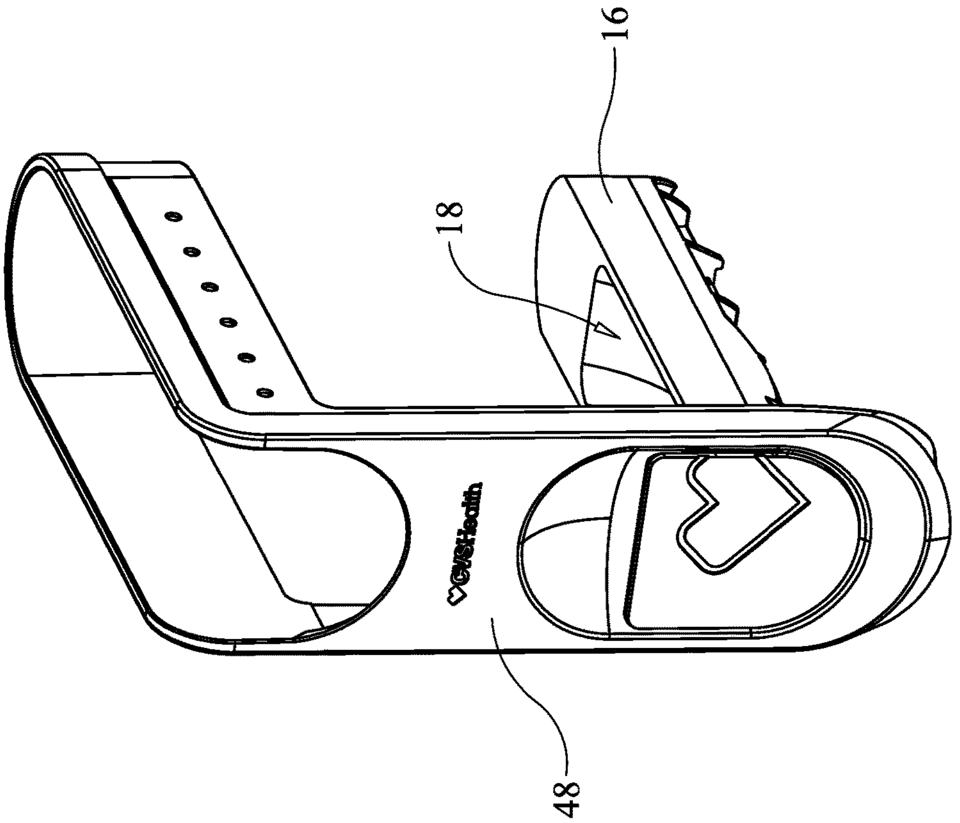

The dispensing base 14 may include a ballast 36 as illustrated in FIG. 22. The ballast 36 may help maintain the modular dispenser 10 in an upright position or otherwise reduce the risk that the modular dispenser 10 might tip during use. The ballast 36 may be made of any material, including metal or plastic, and is typically denser than the material out of which the modular dispenser 10 and its subcomponents are made. The ballast 36 may be made of aluminum, stainless steel, and other similar metals. The left side 20 may include a ballast retention structure 38 configured to retain the ballast 36 in position within the dispensing base 14. The ballast retention structure 38 may include one or more planar surfaces 40 that extend away from the dispensing base 14, ballast ribs 42 that extend away from the dispensing base, and/or alignment features 44 on a bottom 19 of the left side 20.

The dispensing base 14 may also include one or more alignment features 44 with complementary structures on the left side 20 and the right side 22. The alignment features 44 may be snap fit structure, key and slot, recesses configured to receive flexible tabs/fingers, and so forth.

The dispensing base 14 may include complementary coupling structures 46 on an exterior of the left side 20 and the right side 22. The coupling structures 46 may allow a user to couple and decouple adjacent dispensing bases 14 to each other to allow for easy and convenient storage of multiple dispensing bases 14 together. The coupling structures 26 may be of any type, including a key and slot—as illustrated, the heart is a key that fits into a complementary slot—snap fit structures, and so forth.

The dispensing base 14 may include a front, front side, or front cap 48 configured to couple to one or both of the front and/or the top of the left side 20 and the right side 22. The front side or front cap 48 may be formed of any material, such as metal, wood, and plastic. Typically, a molded or cast plastic is used to form the front side 48. The front side 48 may include a front cap opening, drawer opening, or hole 50 through which the drawer 16 is configured to be received into and out of the dispensing base 14. The front side 48 may include a depression 52 configured to provide sufficient space for a user's finger to manipulate the drawer 16 when the drawer 16 is positioned fully within the dispensing base 14. The depression 52 may be at least partially concave in shape, although any shape is permissible. The front side 48 may also include one or more alignment features 54 with complementary structures on the left side 20 and the right side 22. The alignment features 54 may be snap fit structure, key and slot, recesses configured to receive flexible tabs/fingers, and so forth.

The drawer 16 is best illustrated in FIGS. 13A-13C, 14, 15A and 15B. The drawer 16 may be formed of any material, such as metal, wood, and plastic. Typically, a molded or cast plastic is used to form the drawer 16. The drawer 16 may include a removable cap 56 to provide a tactilely pleasing surface for a user's finger to engage. The drawer 16 may be of any shape, although as illustrated it has a rounded rear portion 58 and parallel sides 60.

The well 18 may be of any shape. For example, the well 18 may have a first width 62 proximate a top 61 of the well 18 that is greater than a second width 64 proximate a bottom 63 of the well 18. The first width 62 should be wide enough to travel proximate to and/or engage at least one guiding rail 28 without significant lateral movement in the drawer 16 as it travels into and out of the dispensing base 14 and without causing binding or difficult opening or closing of the drawer 16. The second width 64 may be maximized within the overall width of the dispensing base 14, typically at least the width of a user's finger. The well 18 may also include a front slope 67 and/or a rear slope 69. The front slope 67 and the rear slope 69 may be different or they may be the same. The front slope 67 may be greater than the rear slope 69. The front slope 67 may be relatively steeper to allow a user to slide a pill 500 up the front slope 67 and retrieve the pill 500 with her finger or fingers. The rear slope 69 may be relatively shallower than the front slope 67, although it should be steep enough that pills 500 may overcome any surface friction and slide down the rear slope 69 towards the front of the drawer 16 where the pills 500 will be more easily reached by the user. The front slope 67 and the rear slope 69 may be defined by an angle or a radius of curvature. For example, the front slope 67 may have a radius of curvature with a range between 5 millimeters to 30 millimeters or 10 millimeters to 20 millimeters. As another example, the rear slope 69 may have a radius of curvature with a range between 10 millimeters to 40 millimeters or 15 millimeters to 30 millimeters.

The well 18 also has a depth 71. For example, the depth 71 may be deep enough to hold one or more pills 500 without causing the drawer 16 to jam in the dispensing base 14 as a user attempts to open or close the drawer 16. The depth 71 of the well may have a depth that is a function of a dimension, such as width or length of the pill 500. For example, the depth 71 may be several millimeters deeper than a width of the pill 500. As an example, if a width of a pill is 10 millimeters, the depth 71 of the well 18 might be 15 millimeters. The depth 71 might have a range of depths relative to a dimension of the pill 500. For example, the depth 71 may range from 1 millimeter to 10 millimeters deeper than the width or length of the pill 500 or from 3 millimeters to 7 millimeters deeper than the width or length of the pill 500.

The drawer 16 may include one or more ribs 66 on a lower surface 65 of the drawer 16. The ribs 66 may increase the structural rigidity of the drawer 16 while keeping the drawer 16 low in mass. The lower surface 65 may include a stop surface 68 configured to engage with the roller 32 when the drawer 16 is fully inserted into the dispensing base 14 as illustrated in FIG. 15A.

Figure 15A:
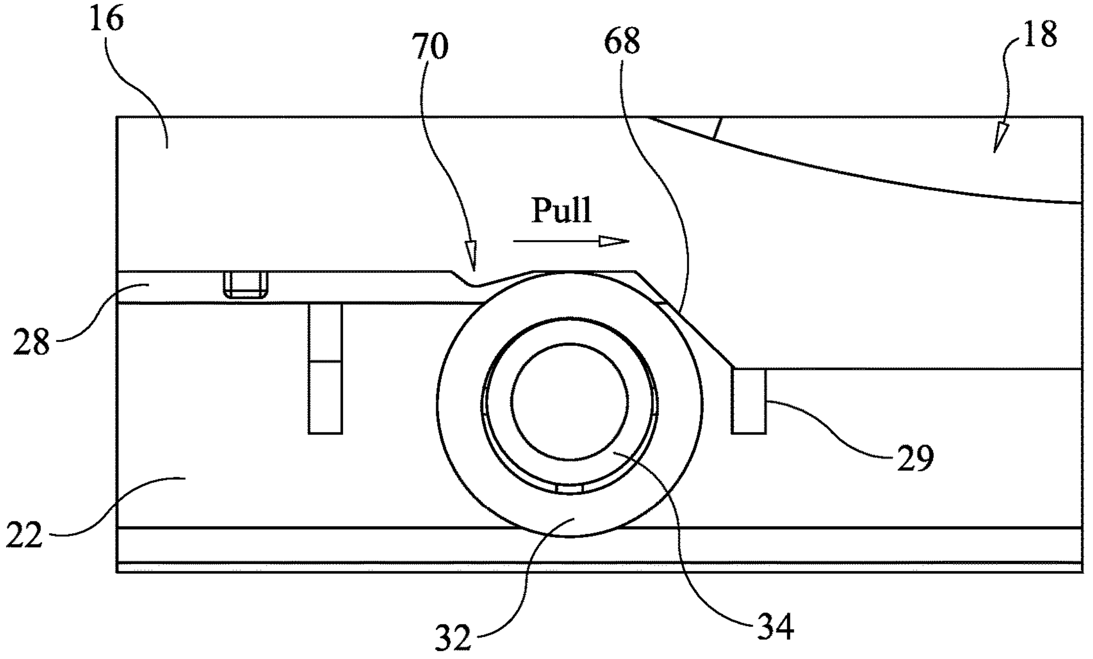
FIGS. 15A and 15B are close-up views of the drawer in the dispensing base.
Figure 15B:
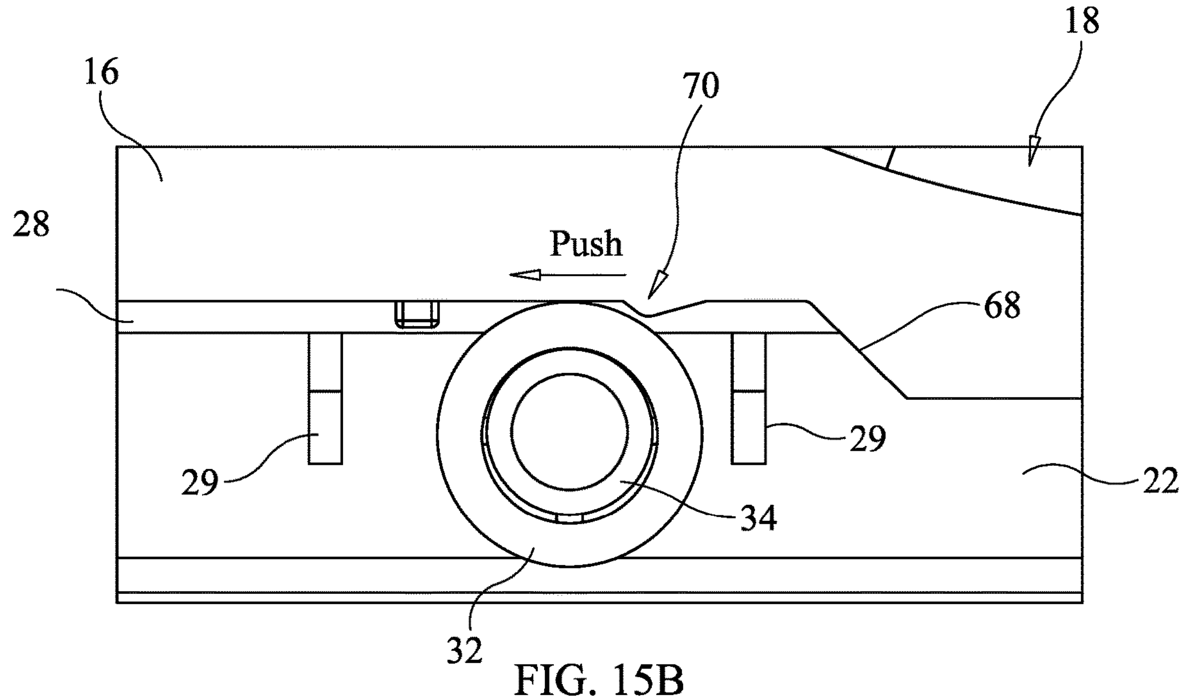
Figure 16:
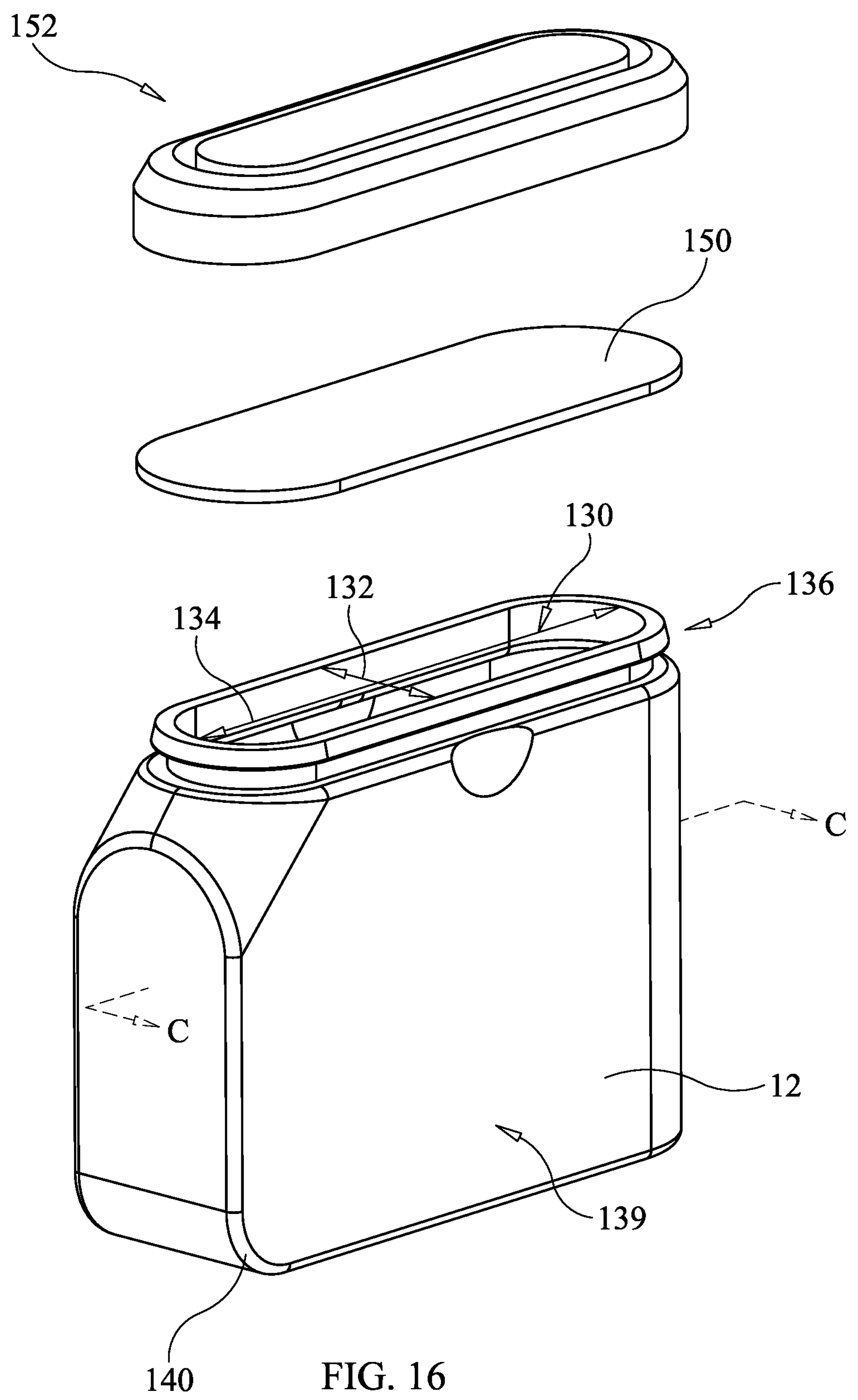
FIG. 16 is an exploded view of an example of a cartridge, a tamper evident seal, and a lid.
Figure 17A:
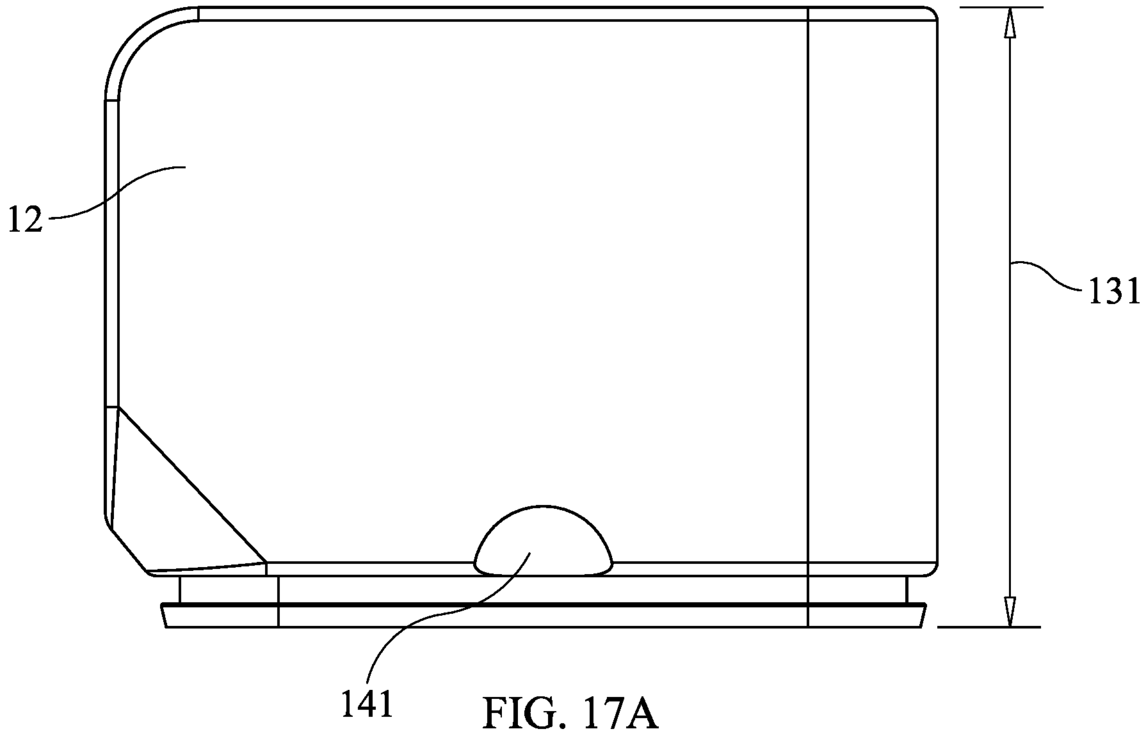
FIGS. 17A and 17B are side and front plan views of the cartridge of FIG. 16.
Figure 17B:
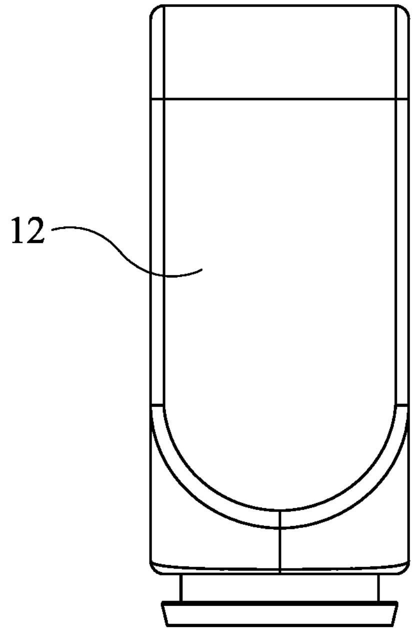

The lower surface 65 of the drawer 16 may also include a drawer detent 70 as illustrated in FIG. 13 and in operation in FIG. 15A (opening the drawer 16) and FIG. 15B (closing the drawer 16). The drawer detent 70 may provide a user with tactile feedback while she opens and closes the drawer 16. The drawer detent 70 may also reduce the risk that the drawer 16 unintentionally opens if the dispensing base 14 is tipped forward. The drawer detent 70 includes a slope angle 72 (or 0) and a height 74 configured to provide a minimum amount of force for the user to open the drawer 16 while still minimizing the risk of the drawer 16 unintentionally opening. For example, the force to open may be relatively low due to a small interaction area of the height 74 and a relatively shallow slope angle 72 while the force to close may be relatively higher, suggesting a more rapid decrease in the height 74 of the drawer detent 70. For example, a force to open the drawer 16 may range from 1 Newton to 10 Newtons or from 2 Newtons to 7 Newtons, while a force to close the drawer may range from 2 Newtons to 12 Newtons or from 4 Newtons to 8 Newtons.

Figure 24:
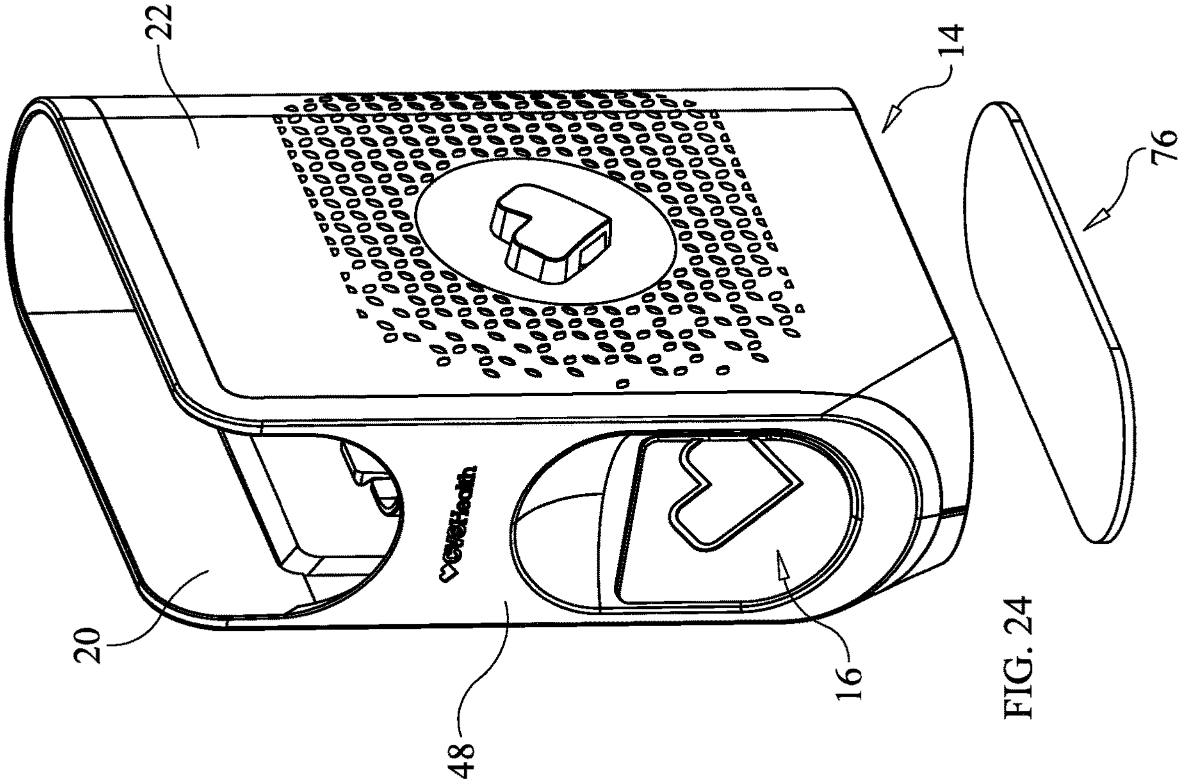
Figure 23:
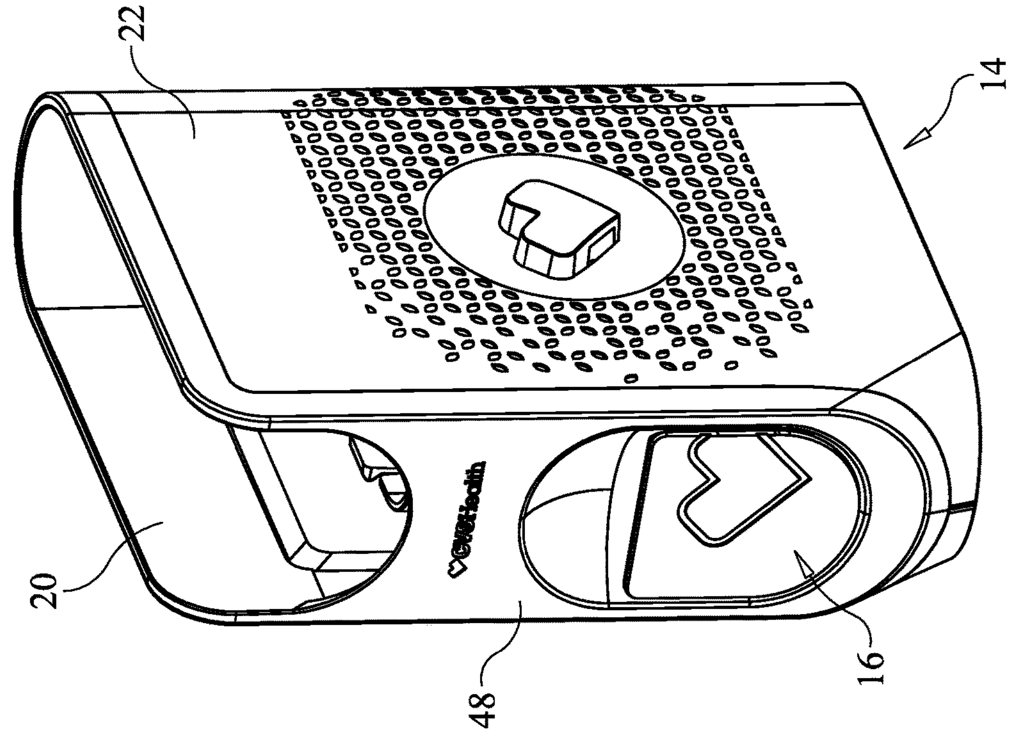

The dispensing base 14 may include a bottom grip 76 on one or both of a portion or an entirety of a bottom of the left side 20 and the right side 22 as illustrated in FIG. 24. The bottom grip 76 may be configured to improve the stability of the dispensing base 14 during normal use as the dispensing base 14 rests upon a countertop or other surface. The bottom grip 76 may be made of rubber, silicone, elastomer, or other material that has a coefficient of friction higher than a coefficient of friction of the material from which the dispensing base 14 is formed. The bottom grip 76 may include a self-adhesive, glue, mechanical connector (hook-and-loop fastener, for example) or other layer (not illustrated) configured to adhere the bottom grip 76 to one or both of the bottom of the left side 20 and the right side 22.

The dispensing base 14 may include a funnel 78, illustrated at FIGS. 1, 10A, 10B, 11A, and 11B, configured to receive and convey the pill or pills 500 from the cartridge 12 through the dispensing base 14 and into the well 18 of the drawer 16. The funnel 78 may be formed of any material, such as metal, wood, and plastic. Typically, a molded or cast plastic is used to form the funnel 78, which may be made as an integral component or may be formed of two or more subcomponents coupled together via complementary alignment features (not illustrated), such as snap fittings (e.g., pin and snap, elastic fingers configured to be received in recesses, key and slots, and the like), adhesives, welding of any type, and the like. The surface of the funnel 78 may be relatively smoother and/or glossier than the surfaces of the dispensing base 14 and other components to reduce a coefficient of friction of the surface of the funnel 78.

The funnel 78 may have a funnel height 79 that should be relatively smaller than a height 131 of the cartridge 12, which could permit a user to better view the number of pills 500 remaining in the cartridge 12. The funnel height 79 may be a function of a funnel slope angle 100 (discussed) below to ensure the funnel slope angle 100 falls within a desired range to ensure the pills 500 slide or flow properly down the funnel 78.

The funnel 78 may include a funnel inlet 80 configured to be positioned proximate a cartridge opening 130 when the cartridge 12 is coupled to the dispensing base 14. Optionally, the funnel inlet 80 may be positioned within the cartridge opening 130 when the cartridge 12 is coupled to the dispensing base 14, which may reduce the risk a pill 500 could become stuck or jammed within the cartridge 12. The funnel inlet 80 may have an inlet width 82 and an inlet length 84 sized similarly to a cartridge opening width 132 and a cartridge opening length 134.

The funnel 78 may include an alignment feature or engagement mechanism 86, such as snap fittings (e.g., pin and snap, elastic fingers configured to be received in recesses, key and slots, and the like), configured to removably couple to a funnel latch interface 142 proximate the cartridge opening 130 of the cartridge 14 as described below. The alignment feature or engagement mechanism 86 is flexible enough to permit a user to easily insert the dispensing base 14/funnel 78 into the cartridge opening 130 and to also easily remove the dispensing base 14/funnel 78 from the cartridge opening 130 while being rigid enough to prevent the dispensing base 14/funnel from being unintentionally removed from the cartridge opening 130 in the event the modular dispenser 10 is unintentionally overturned or upset.

Figure 10A:
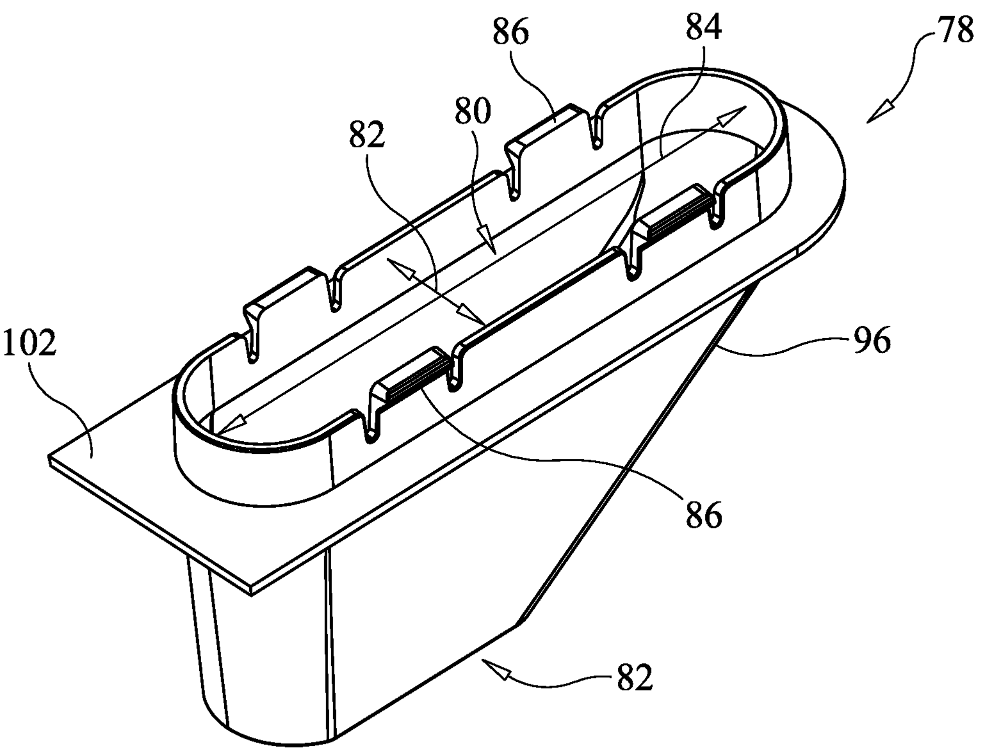
FIGS. 10A and 10B are a perspective and top plan views of an example of a funnel.
Figure 10B:
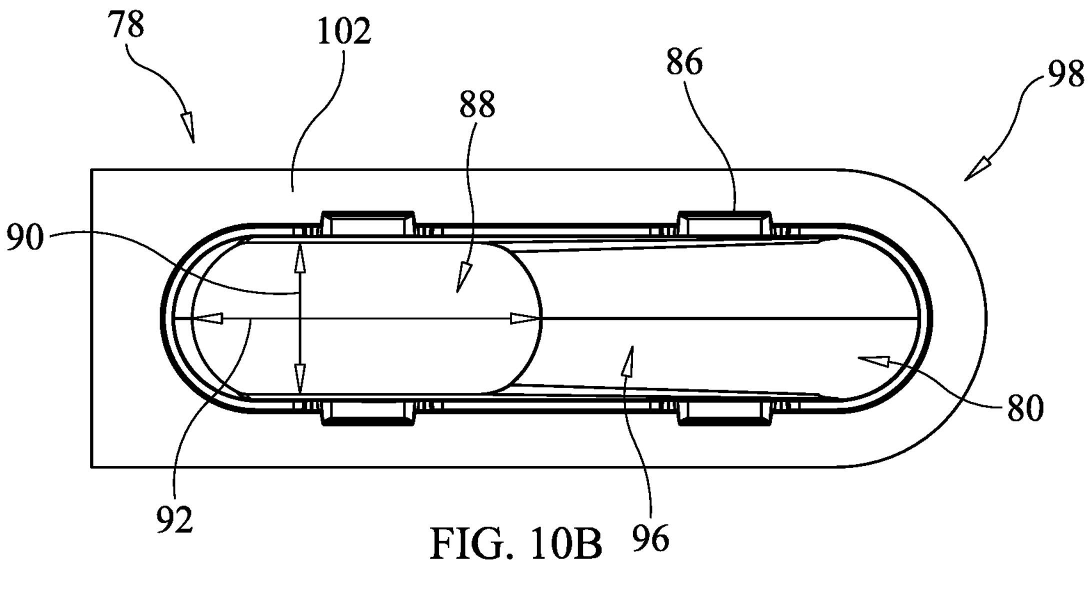
Figure 11A:
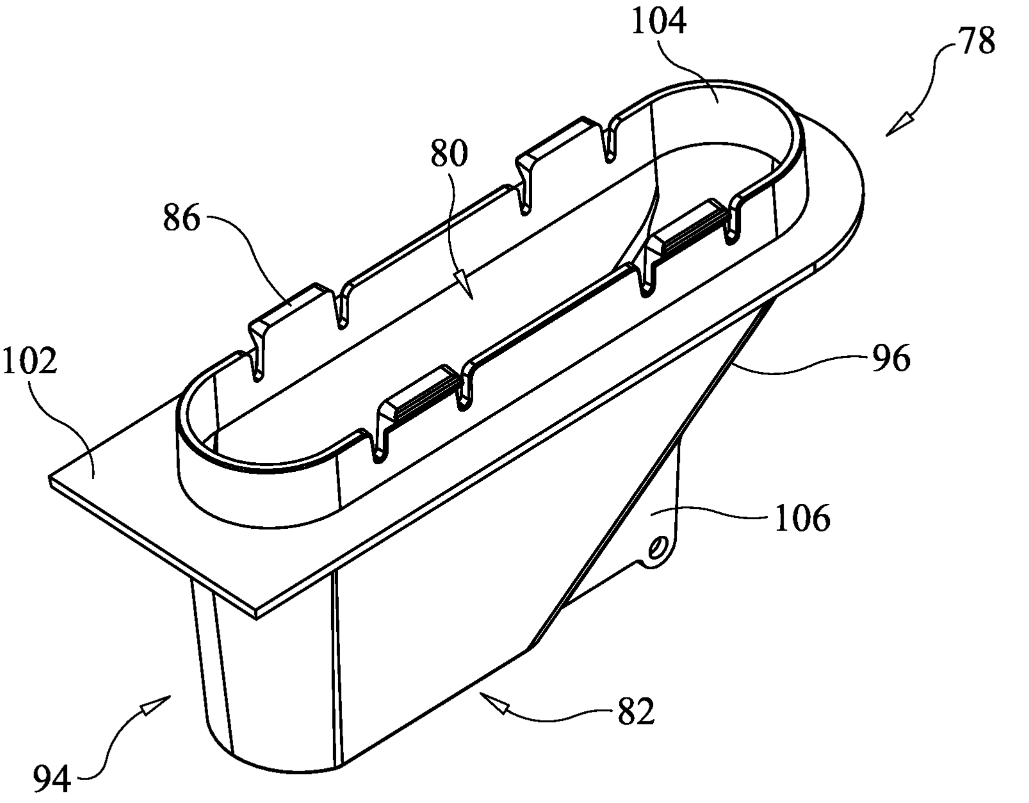
FIGS. 11A and 11B are perspective and side plan views of another example of a funnel.
Figure 11B:
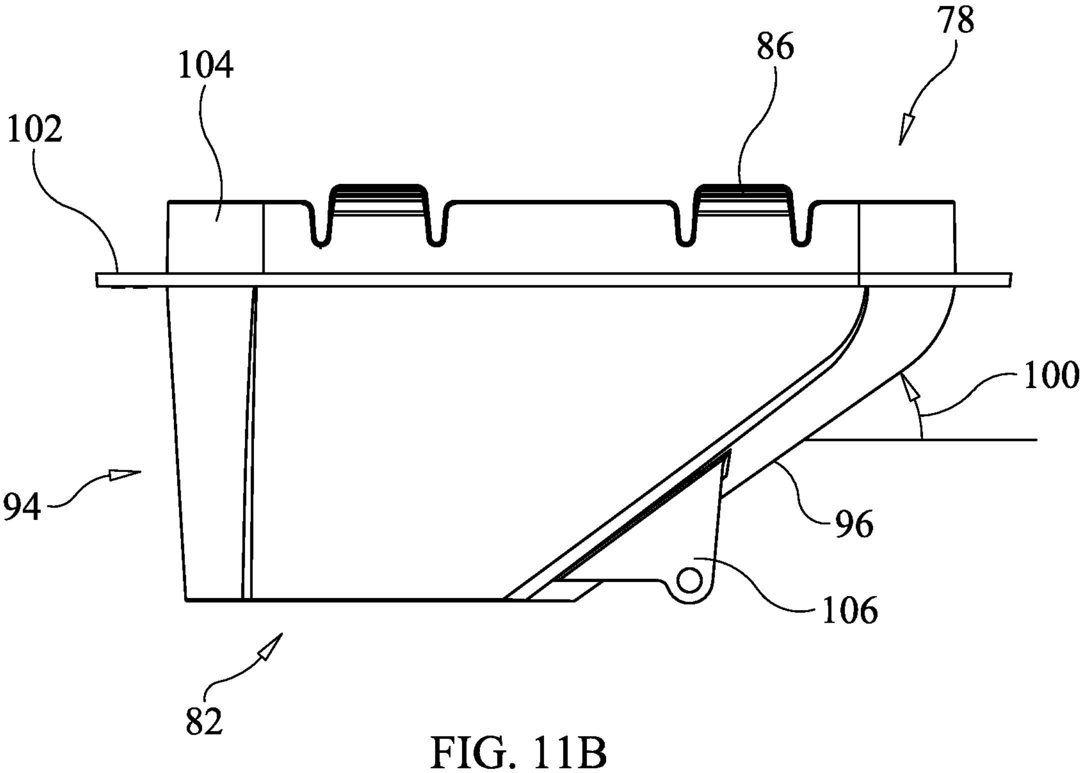

The funnel 78 also includes a funnel outlet 88 spaced apart from the funnel inlet 80 as best illustrated in FIG. 10B. The funnel outlet 82 is configured to be positioned proximate the well 18 of the drawer 16 when the drawer 16 is positioned within the dispensing base 14. The funnel outlet 88 includes an outlet width 90 and an outlet length 92, which individually and collectively may be sized and shaped to enable a pill or pills 500 to flow easily through the funnel outlet 88 without the pill or pills 500 jamming or otherwise occluding the funnel outlet 88.

A front portion 94 of the funnel 78 may be vertical within plus or minus 10 degrees. A funnel slope 96 proximate a rear interior portion 98 of the funnel 78 may have a slope angle 100 relative to horizontal sufficient to permit a pill or pill 500 to overcome any friction of the funnel slope 96 and move down the funnel slope 96 under the influence of gravity. For example, a coefficient of friction for a polypropylene material from which the funnel 78 may be made may range from 0.23 to 0.44 and the slope angle 100 may increase as the coefficient of friction increases. As examples, the slope angle 100 may range from 20 degrees to 70 degrees, from 30 degrees to 60 degrees, and from 40 degrees to 50 degrees, or any ranges between and overlapping these ranges.

The funnel 78 may include a funnel platform 102 that extends laterally away from the funnel 78. The funnel platform 102 may extend partially or wholly around the funnel 78. The funnel platform 102 may optionally be sized and shaped to be received upon or between one or more of the pair of ribs 24 of the dispensing base 14.

The funnel 78 also optionally includes a funnel parapet 104 extending away from the funnel 78 towards the opening 130 of the cartridge 12 when the cartridge 12 is coupled to the dispensing base 12/funnel 78. At least one of the funnel parapet 104 and the perimeter 136 of the opening 130 of the cartridge includes an alignment feature or engagement mechanism 86 configured to engage the other of the funnel parapet 104 and the perimeter 136 of the opening 130 of the cartridge 12. As discussed above, the alignment feature or engagement mechanism 86 may include a snap-fitting configured to engage a ridge or tapered surface 146 on the perimeter 136 of the opening 130 of the cartridge 12.

The funnel 78 optionally includes at least one and, in some examples, at least a pair of brackets or a flap retainers 106. The bracket 106 optionally may be coupled to the funnel 78 proximate a rear portion 98 of the funnel 78 and/or along an exterior of the funnel slope 96. The bracket or flap retainer 106 may flex apart to receive a pin 124 of a flap or flapper 108. While the bracket or flap retainer 106 as illustrated provides for pivotable rotation of the flapper 108, other examples of brackets may provide for sliding movement (such as a drawer), clamshell operation, any variety of valves, and so forth.

Figure 12A:
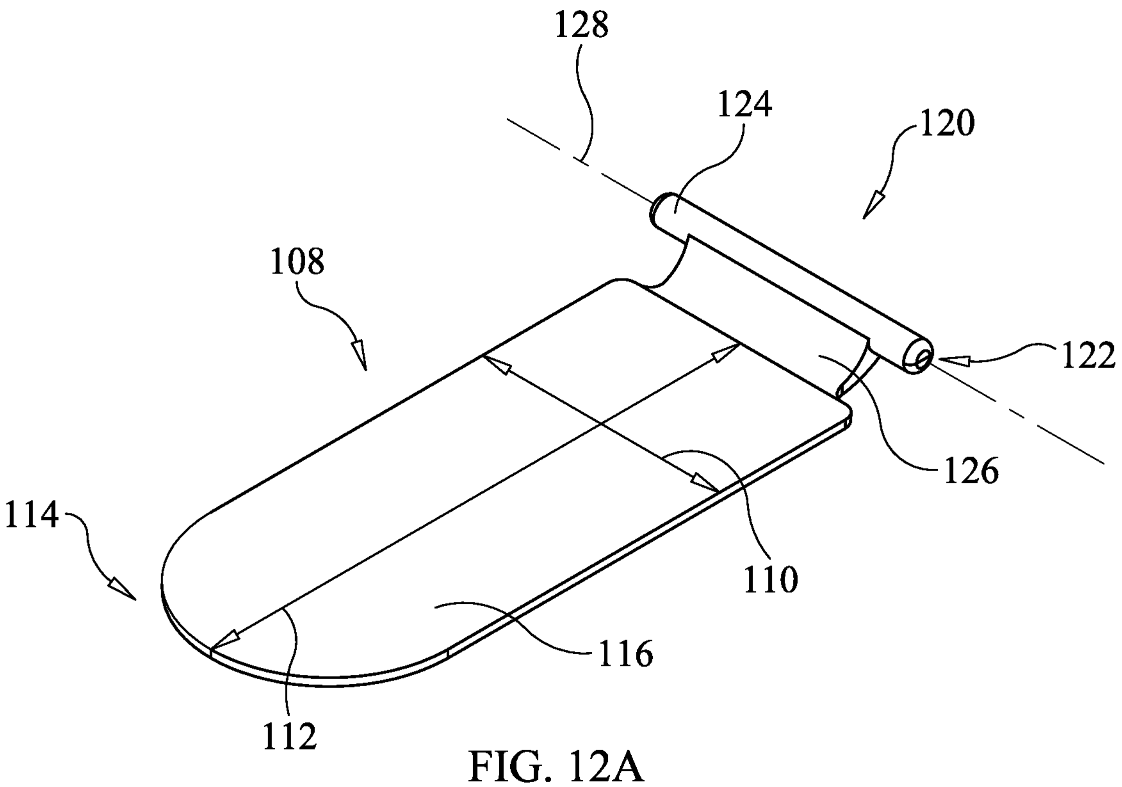
FIGS. 12A and 12B are perspective and side plan views of an example of a metering flap.
Figure 12B:
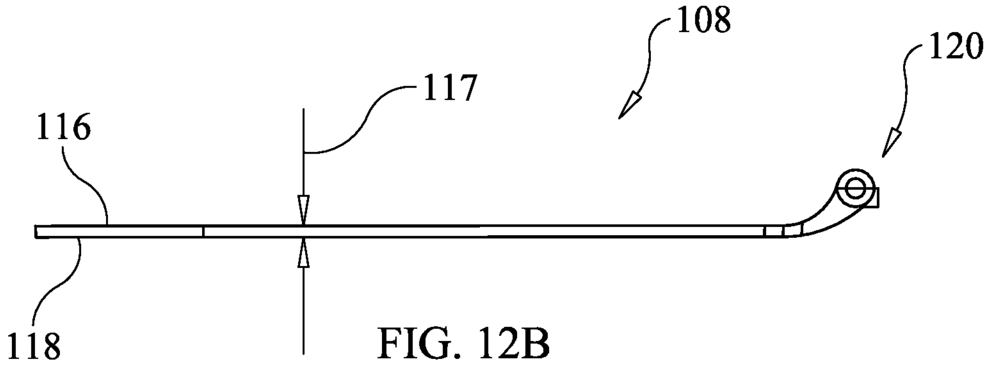
Figure 13A:
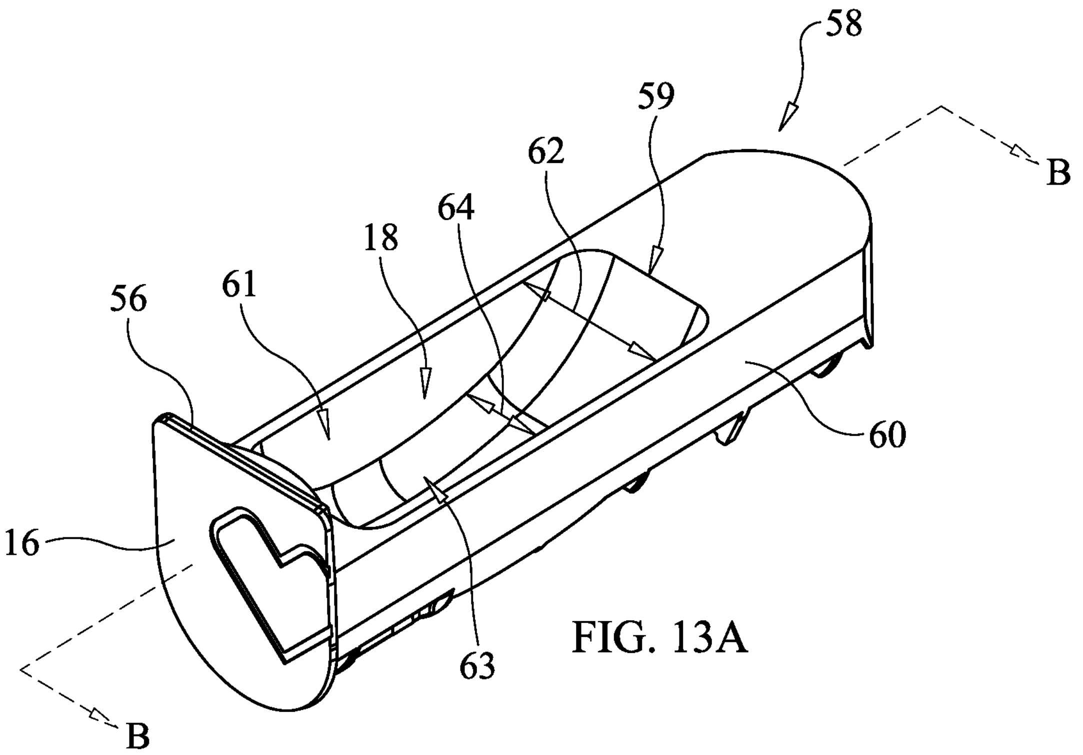
FIGS. 13A, 13B, and 13C are perspective, side, and bottom plan views of an example of a drawer.
Figure 13B:
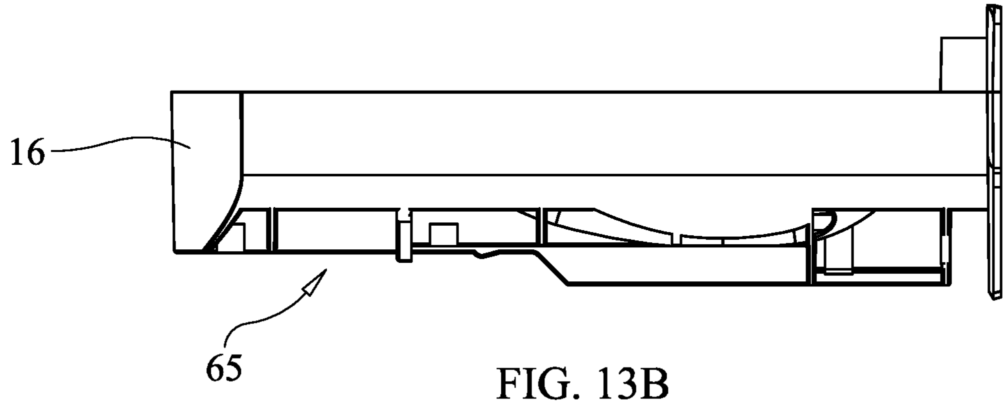
Figure 13C:
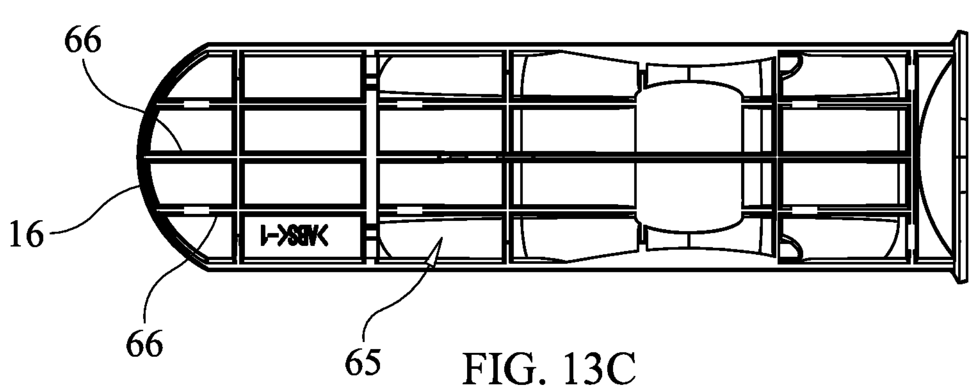
Figure 14:
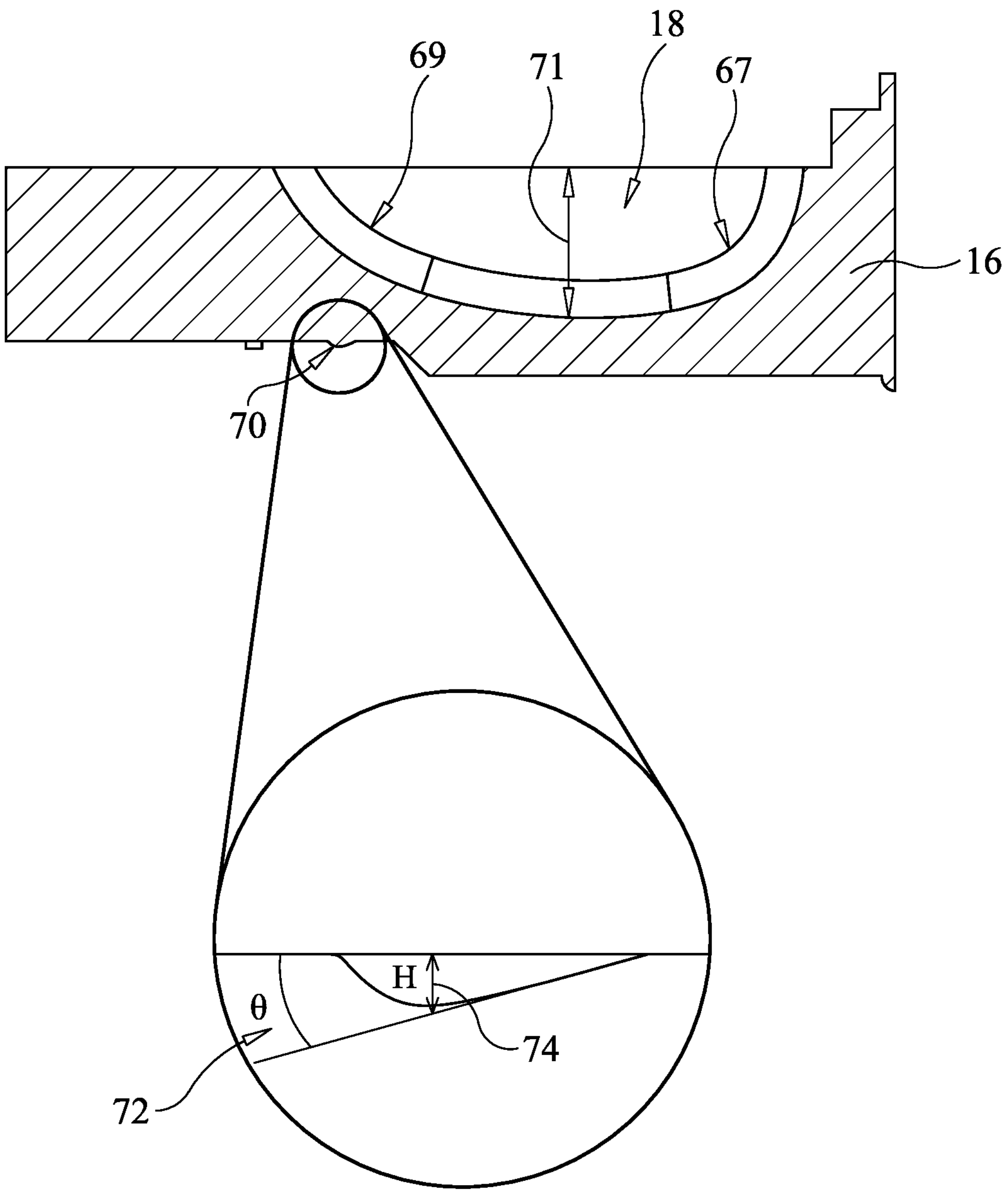
FIG. 14 is a cross-section and close-up of the drawer in FIG. 13A.

The dispensing base 14 may also include a metering flap, flap, or flapper 108 as illustrated in FIGS. 12A and 12B. The metering flap 108 may be formed of any material, such as metal, wood, and plastic. Typically, a molded or cast plastic is used to form the metering flap 108. The metering flap 108 may optionally be flexible.

The metering flap 108 optionally may be movably positioned between the funnel outlet 88 and the well 18 of the drawer 16. The metering flap 108 may be pivotably coupled to at least one of the funnel 78, as illustrated, or in another example it could be pivotably coupled to the dispensing base 14. The metering flap 108 could be of any shape and/or size that is configured to one of a) at least partially block and b) fully block the funnel outlet 88 when the drawer 16 is slidably extended away from the dispensing base 14. For example, the metering flap could have a flap width 110 and a flap length 112, a radius, multiple foci, or other such dimensional parameters. The flap width 110 may be less than or equal to one or both of the first width 62 and the second width 64 of the well 18 of the drawer 16. The metering flap 108 may be configured to be at least partially received within the well 18 when the drawer 16 is slidably moved into the dispensing base 14.

The metering flap 108 may be planar over at least a portion of the metering flap 108 as illustrated with an upper surface 116 spaced apart a height 117 from a lower surface 118. A front portion 114 of the metering flap 108 may be rounded or have a radius of curvature. A rear portion 120 of the metering flap 108 may include a coupling mechanism 122, such as a pin 124, hinge, flap, or other mechanism. The coupling mechanism 122 may be spaced apart from the metering flap 108 via an extension 126 that provides horizontal and/or vertical distance between an axis of rotation 128 or other axis about which the metering flap 108 might move.

A rear lip 59 of the drawer 16 (FIG. 13A) may be configured to engage the lower surface 118 of the metering flap 108 when the drawer 16 is slidably extended away from the dispensing base 14, thereby causing the metering flap 106 to pivot and to at least partially block the funnel outlet 88.

In practice, as illustrated at FIGS. 3A, 3B, 15A, 15B, and 22, a user opens the drawer 16 causing several interactions to occur. First, gravity previously has acted on the pills 500 present in the funnel 78 so that at least one pill 500 or more likely a plurality of pills 500 is present proximate the funnel outlet 88 and in the well 18 of the drawer 16. The user pulls open the drawer 16 by applying enough force to the drawer cap 56 of the drawer 16 to cause the roller 32 to overcome the friction of the drawer detent 70. As the drawer 16 is withdrawn from the dispensing base 14, the rear lip 59 of the well 18 may interact with the lower surface 118 of the metering flap 108, causing the metering flap 108 (if present) to pivot upward and at least partially blocking the funnel outlet 88 to prevent any further pills 500 from entering the well 18 of the drawer 16 and/or minimizing the risk that a pill or pills 500 may jam the drawer 16 in position. The user may withdraw the drawer 16 sufficiently far so that she may then remove one or more pills 500 from the well 18 of the drawer 16. After the user removes the desired pill or pills 500 from the well 18, the user may then proceed to push the drawer 16 closed within the dispensing base 14. As the drawer 16 enters further into the dispensing base 14, the rear lip 59 moves rearward and gravity causes the metering flap 108 to pivot downward about the pin 124, thereby exposing the funnel outlet 88 to the well 18 of the drawer 16 and permitting a pill or pills 500 to travel from the funnel outlet 88 into the well 18 under the influence of gravity. The user may then apply a nominal force to the drawer cap 56 and the drawer 16 so that the roller 32 overcomes the drawer detent 70. The well 18 of the drawer 16 may now be filled again with pills and be ready to be withdrawn again by the user.

The cartridge 12 may be formed of any material, such as metal, wood, and plastic. Typically, a molded or cast plastic is used to form the cartridge 12. The plastic optionally may be transparent, semi-transparent, or translucent to allow a user to view the pills 500 within the cartridge 12.

The cartridge 12 may include an opening or cartridge opening 130 through which the pills 500 may be initially loaded and from which the pills 500 may descend under the influence of gravity when the cartridge 12 is coupled to the funnel 78 and/or dispensing base 14. The cartridge opening includes an opening width 132 and an opening length 134. The opening 130 may also include a perimeter 136 that surrounds the opening 130. Optionally, the cartridge 12 may be of any shape. For example, the shape of cartridge 12 may be keyed to the shape of the dispensing base 14/funnel 78 so that the proper orientation of the cartridge 12 relative to the dispensing base 14/funnel 78 is visually and/or tactilely apparent.

An interior surface 137 of the cartridge 12 may be vertical or sloped to improve the ability of the pills 500 to move through the cartridge 12 and into the funnel 78 under the influence of gravity and to reduce the risk that any pill 500 would become stuck or retained within the cartridge 12 under normal use.

One or more radii 140 may be present about an exterior surface 139 of the cartridge 12. The radii 140 may provide a smooth intersection of two surfaces rather than a sharp corner. The cartridge 12 may also include at least one recess 141 in the exterior surface 139. The recess 141 may be concave and/or hemispherical in shape and be configured to allow a user to use her finger to gain purchase under the lid 152 when the lid 152 is positioned upon the cartridge so as to reduce the effort required to remove the lid 152 from the cartridge 12.

Figure 18A:
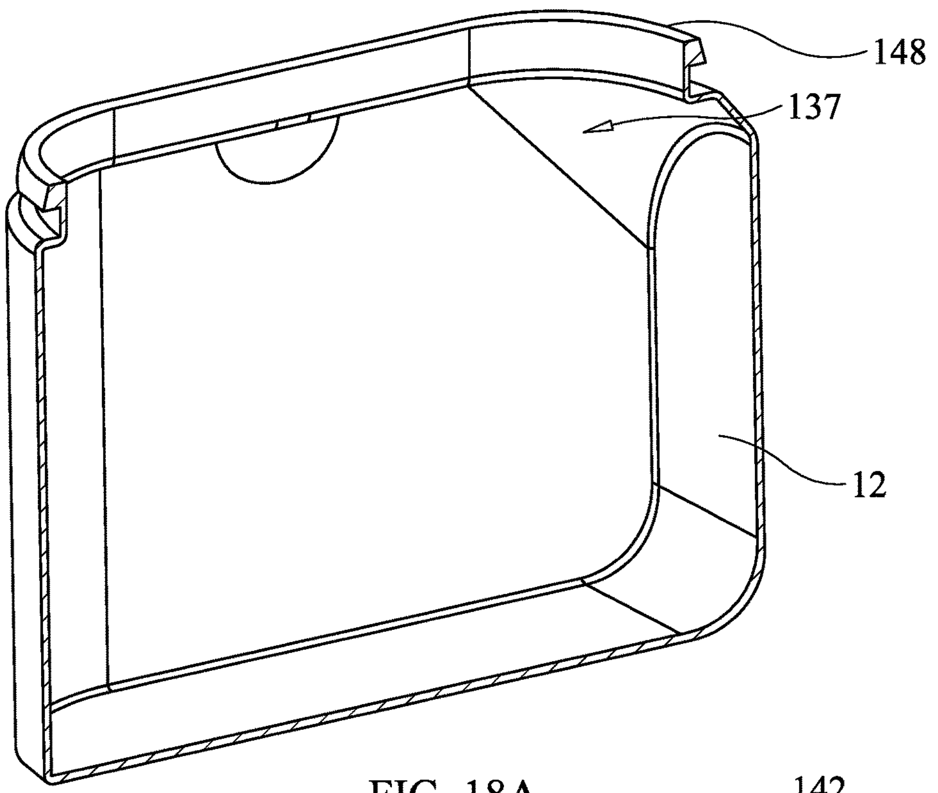
FIGS. 18A, 18B, and 18C are a cross-section and close-up views of the cartridge in FIG. 16.
Figure 18B:
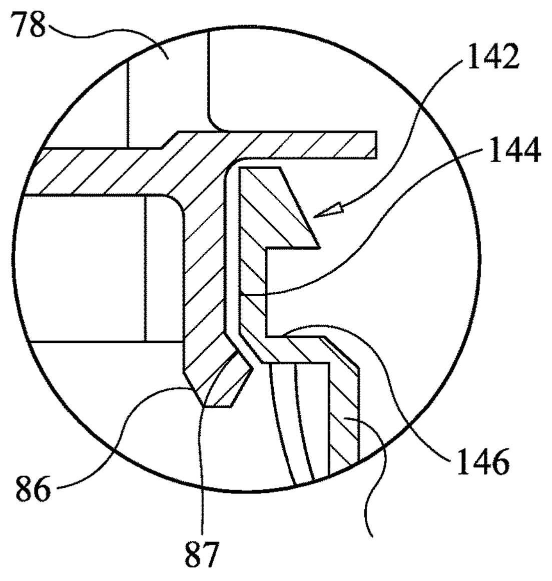

The opening 130 may include a funnel latch interface 142 configured to engage with the alignment mechanism or engagement mechanism 86 of the funnel 78 as illustrated in FIG. 18B. The funnel latch interface 142 may include a vertical portion 144 and/or a tapered portion 146 configured to engage with the alignment feature or engagement mechanism 86 and/or a latch 87 of the engagement mechanism 86. The configuration of the engagement mechanism 86 and the funnel latch interface 142 should reduce the risk that a pill or pills 500 might become lodged or stuck against the engagement mechanism 86 and the funnel latch interface 142. The funnel latch interface 142 may also include a tapered surface 148. The tapered surface 148 may be spaced apart from the vertical surface 144. The tapered surface 148 of the funnel latch interface 142 may be configured to engage with a latching mechanism 154 of the lid 152.

The cartridge perimeter 136 may include a lip 148 configured to receive a removable tamper evident seal 150. The tamper evident seal 150 may include a pull-tab (not illustrated) to allow a user a surface to grasp when removing the tamper evident seal 150 prior to inserting the cartridge 12 into the dispensing base 14.

Figure 18C:
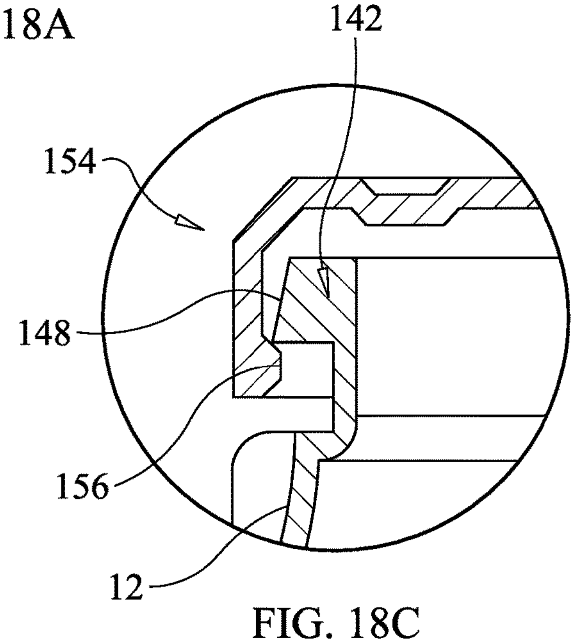
Figure 19:
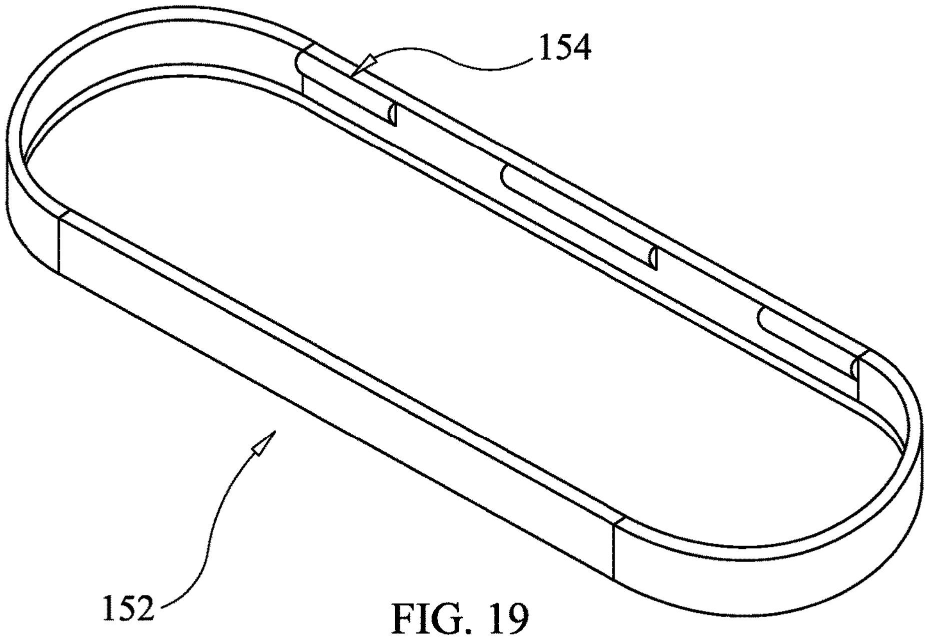
FIG. 19 is a perspective view of an example of the lid of FIG. 16.
Figure 20:
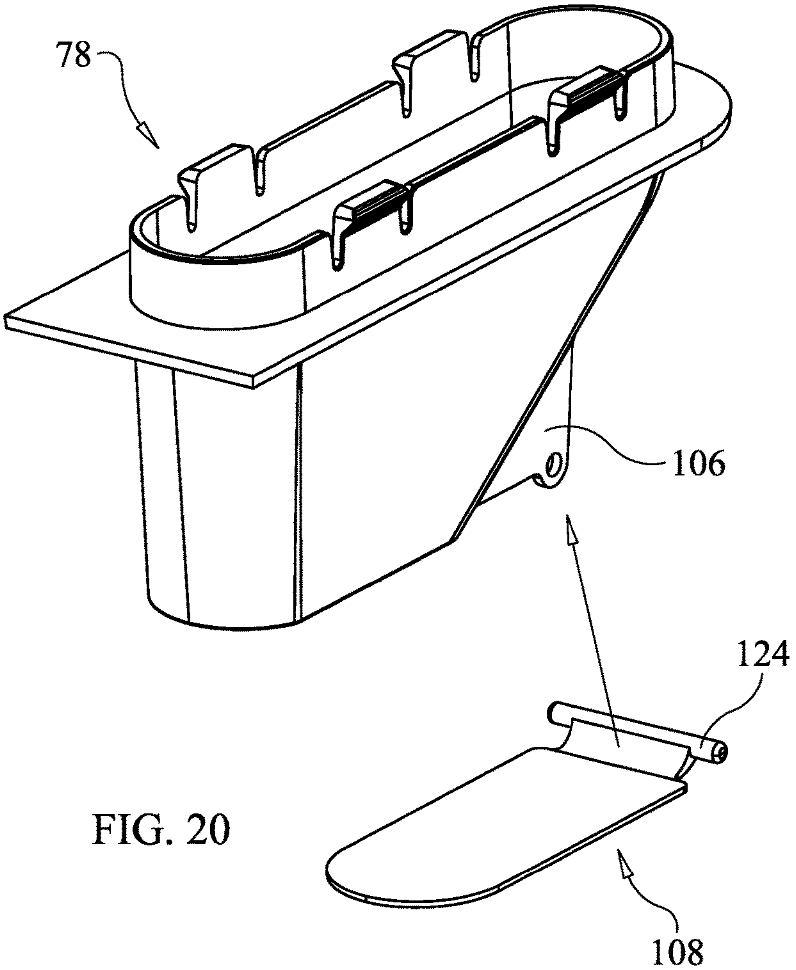
FIG. 20 through 24 are perspective views of an example of assembling or manufacturing a modular dispenser.

The cartridge 12 optionally also includes a lid 152 configured to be coupled to the cartridge 12 and to removably cover the opening 130. The lid 152 may be formed of any material, such as metal, wood, and plastic. Typically, a molded or cast plastic is used to form the lid 152. The lid 152 may optionally be flexible. The lid 152 may be symmetrical about a long axis and/or or a short axis. The lid 152 may include a latching mechanism 154 configured to engage with the funnel latch mechanism 142. For example, a flexible snap 156 of the latching mechanism 154 may engage with the tapered surface 148 of the funnel latch mechanism 142 as illustrated in FIG. 18C.

An example of assembling a modular dispenser 10 for pills 500 is illustrated in FIG. 20-24. The method includes partially inserting the drawer 16 into the front cap, drawer opening, or hole 50 of the front side or front cap 48 of the dispensing base 14. The method may also include positioning the funnel 78 adjacent to one of the left side or left panel 20 and the right side or right panel 22 of the dispensing base 14. The method may include coupling the left side or left panel 20 to the right side or right panel 22 of the dispensing base 14. The method may also include coupling the front side or front cap 48 to the left side or left panel 20 and the right side or right panel 22. The method may also include pivotally coupling the metering flap 108 to one of the dispensing base 14 and the funnel 78.

A number of implementations have been described. Nevertheless, it will be understood that additional modifications may be made without departing from the scope of the inventive concepts described herein, and, accordingly, other examples are within the scope of the following claims.

What is claimed is:

1. A modular dispenser, comprising:
- a cartridge configured to hold a plurality of pills, the cartridge comprising an opening through which at least one pill is configured to pass under an influence of gravity and a perimeter that extends around the opening;
- a dispensing base configured to removably receive the cartridge, the dispensing base comprising a funnel comprising:
  - a funnel inlet proximate the opening of the cartridge;
  - a funnel outlet spaced apart from the funnel inlet; and
  - at least one flap retainer along an exterior of a funnel slope, wherein the at least one flap retainer extends away from the funnel slope;
- a drawer configured to receive the at least one pill, the drawer configured to be slidably received within the dispensing base, the drawer comprising a well to receive the at least one pill from the funnel outlet; and
- a metering flap coupled by a pin to the at least one flap retainer, the pin allowing the metering flap to be movably positioned between the funnel outlet and the well of the drawer, wherein:
  - the metering flap is configured to at least partially block the funnel outlet when the drawer is slidably extended away from the dispensing base; and
  - the metering flap is configured to be at least partially received within the well when the drawer is slidably moved into the dispensing base.

2. The modular dispenser of claim 1, further comprising a drawer detent configured to prevent the drawer from unintentionally opening when the drawer is in a fully closed position and to allow the drawer to be pushed into the fully closed position.

3. The modular dispenser of claim 1, wherein a rear lip of the well is configured to engage a lower surface of the metering flap when the drawer is slidably extended away from the dispensing base, thereby causing the metering flap to pivot and to at least partially block the funnel outlet.

4. The modular dispenser of claim 1, wherein the funnel comprises a funnel platform that extends laterally away from the funnel and the dispensing base comprises at least one pair of ribs configured to receive the funnel platform.

5. The modular dispenser of claim 1, wherein the funnel comprises a funnel parapet extending away from the funnel towards the opening of the cartridge wherein at least one of the funnel parapet and the perimeter of the opening of the cartridge comprises an engagement mechanism configured to engage the other of the funnel parapet and the perimeter of the opening of the cartridge.

6. The modular dispenser of claim 5, wherein the funnel parapet comprises the engagement mechanism, the engagement mechanism comprising a snap-fitting configured to engage a ridge on the perimeter of the opening of the cartridge.

7. The modular dispenser of claim 1, wherein the dispensing base further comprises a drawer ceiling configured to at least partially cover the well of the drawer when the drawer is fully received within the dispensing base.

8. The modular dispenser of claim 1, wherein the dispensing base further comprises at least one guiding rail configured to engage with and to guide the drawer.

9. The modular dispenser of claim 1, wherein the dispensing base further comprises at least one travel stop configured to prevent the drawer from being removed from the dispensing base.

10. The modular dispenser of claim 1, further comprising at least one roller upon which the drawer is configured to roll.

11. The modular dispenser of claim 1, wherein the cartridge and the dispensing base comprise a pair of complementary alignment features.

12. The modular dispenser of claim 1, further comprising at least one ballast.

13. The modular dispenser of claim 1, wherein the well is further configured to cause the metering flap to lower and allow access to the funnel outlet when the drawer is slidably returned into the dispensing base.

14. A modular dispensing base configured to dispense at least one pill under an influence of gravity, the modular dispensing base comprising:
- a funnel comprising:
  - a funnel inlet;
  - a funnel outlet spaced apart from the funnel inlet; and
  - at least one flap retainer along an exterior of a funnel slope, wherein the at least one flap retainer extends away from the funnel slope;
- a drawer configured to receive the at least one pill, the drawer configured to be slidably received within the modular dispensing base, the drawer comprising a well to receive the at least one pill from the funnel outlet; and
- a metering flap pivotably coupled by a pin to the at least one flap retainer, wherein:
  - the metering flap is configured to at least partially block the funnel outlet when the drawer is slidably extended away from the funnel outlet; and
  - a rear lip of the well is configured to engage a lower surface of the metering flap when the drawer is slidably extended away from the funnel outlet, thereby causing the metering flap to pivot and to at least partially block the funnel outlet.

15. The modular dispensing base of claim 14, wherein the well is further configured to cause the metering flap to lower and allow access to the funnel outlet when the drawer is slidably returned into the modular dispensing base.

16. The modular dispensing base of claim 14, wherein the metering flap is configured to be at least partially received within the well when the drawer is slidably moved into the dispensing base.

17. The modular dispensing base of claim 14, further comprising a drawer detent configured to prevent the drawer from unintentionally opening when the drawer is in a fully closed position and to allow the drawer to be pushed into the fully closed position.

18. A method of assembling a modular dispenser for pills,
- partially inserting a drawer into a drawer opening of a front cap of a dispensing base, wherein the drawer comprises a well configured to receive at least one pill from the funnel outlet;
- positioning a funnel adjacent to one of a left panel and a right panel of the dispensing base, the funnel comprising:
  - a funnel inlet proximate an opening of a cartridge;

a funnel outlet spaced apart from the funnel inlet; and
at least one flap retainer along an exterior of a funnel slope, wherein the at least one flap retainer extends away from the funnel slope;
coupling the left panel to the right panel of the dispensing base;
coupling the front cap to the left panel and the right panel; and
pivotally coupling with a pin a metering flap to the at least one flap retainer, wherein, when the modular dispenser is assembled:
the metering flap is configured to at least partially block the funnel outlet when the drawer is slidably extended away from the dispensing base; and
a rear lip of the well is configured to engage a lower surface of the metering flap when the drawer is slidably extended away from the funnel outlet, thereby causing the metering flap to pivot and to at least partially block the funnel outlet.

19. The method of claim 18, wherein the well is further configured to cause the metering flap to lower and allow access to the funnel outlet when the drawer is slidably returned into the dispensing base.

20. The method of claim 18, wherein the metering flap is configured to be at least partially received within the drawer when the drawer is slidably moved into the dispensing base.

* * * * *